United States Patent
Oshida et al.

(10) Patent No.: US 9,300,470 B2
(45) Date of Patent: Mar. 29, 2016

(54) SEMICONDUCTOR DEVICE AND METHOD OF WRITING DATA TO SEMICONDUCTOR DEVICE

(71) Applicant: Renesas Electronics Corporation, Kawasaki-shi, Kanagawa (JP)

(72) Inventors: Daisuke Oshida, Kanagawa (JP); Shigeru Furuta, Kanagawa (JP); Masayuki Hirokawa, Kanagawa (JP); Akira Yamazaki, Kanagawa (JP); Takashi Fujimori, Kanagawa (JP); Shigemasa Shiota, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 14/671,766

(22) Filed: Mar. 27, 2015

(65) Prior Publication Data
US 2015/0207629 A1 Jul. 23, 2015

Related U.S. Application Data

(63) Continuation of application No. 13/523,969, filed on Jun. 15, 2012, now Pat. No. 9,026,882.

(30) Foreign Application Priority Data

Jun. 20, 2011 (JP) .................................. 2011-136133

(51) Int. Cl.
*H03M 13/00* (2006.01)
*H04L 9/32* (2006.01)
*H03M 13/29* (2006.01)

(52) U.S. Cl.
CPC ............. *H04L 9/3226* (2013.01); *H03M 13/29* (2013.01); *H03M 13/63* (2013.01); *H04L 9/3278* (2013.01); *H04L 2209/04* (2013.01); *H04L 2209/08* (2013.01); *H04L 2209/34* (2013.01)

(58) Field of Classification Search
None
See application file for complete search history.

(56) References Cited

U.S. PATENT DOCUMENTS 6,092,231 A 7/2000 Sze
6,460,137 B1 10/2002 Akiyama et al.
(Continued)

FOREIGN PATENT DOCUMENTS

JP 8-335040 A 12/1996
JP 10-327143 A 12/1998
(Continued)

OTHER PUBLICATIONS

Extended European Search Report issued Sep. 10, 2012 in European Patent Application No. 12169350.1.
(Continued)

*Primary Examiner* — Daniel McMahon
(74) *Attorney, Agent, or Firm* — Shapiro, Gabor and Rosenberger, PLLC

(57) ABSTRACT

A semiconductor device has: a unique code generating unit generating an initial unique code which is a value unique to a device and includes an error in a random bit; a first error correcting unit correcting an error in the initial unique code to generate an intermediate unique code; a second error correcting unit correcting an error in the intermediate unique code to generate a first determinate unique code; and a decrypting unit decrypting, with the first determinate unique code, transmission data obtained by encrypting confidential information with key information generated on the basis of the intermediate unique code by an external device to generate confidential information.

13 Claims, 19 Drawing Sheets

(56) References Cited

U.S. PATENT DOCUMENTS

| | | | |
|---|---|---|---|
| 7,757,297 B2 | 7/2010 | Herberth et al. | |
| 8,683,295 B1 | 3/2014 | Syu et al. | |
| 8,850,281 B2 * | 9/2014 | Potkonjak | 714/733 |
| 8,856,199 B2 * | 10/2014 | Tanamoto et al. | 708/255 |
| 8,867,739 B2 * | 10/2014 | Danger | 380/44 |
| 8,990,276 B2 * | 3/2015 | Lazich et al. | 708/250 |
| 2003/0103586 A1 | 6/2003 | Poeppelman et al. | |
| 2006/0133607 A1 | 6/2006 | Forehand et al. | |
| 2007/0268905 A1 | 11/2007 | Baker et al. | |
| 2008/0279373 A1 | 11/2008 | Erhart et al. | |
| 2008/0320318 A1 | 12/2008 | Huang | |
| 2009/0183248 A1 | 7/2009 | Tuyls et al. | |
| 2010/0031065 A1 | 2/2010 | Futa et al. | |
| 2010/0122093 A1 | 5/2010 | Tuyls et al. | |
| 2010/0220859 A1 | 9/2010 | Lu et al. | |
| 2011/0047419 A1 | 2/2011 | Garnier et al. | |
| 2012/0324241 A1 | 12/2012 | Oshida et al. | |

FOREIGN PATENT DOCUMENTS

| | | |
|---|---|---|
| JP | 2006-179001 A | 7/2006 |
| JP | 2008-516472 A | 5/2008 |
| JP | 2008-545323 T | 12/2008 |
| JP | 2010-527219 T | 8/2010 |
| WO | WO-2008/056612 A1 | 11/2007 |
| WO | WO-2010/055171 A1 | 5/2010 |

OTHER PUBLICATIONS

Office Action issued Nov. 4, 2014 in Japanese Patent Application No. 2011-136133.

* cited by examiner

FIG. 2

| BIT POSITION | 0 | 1 | 2 | 3 | 4 | 5 | 6 | 7 | ... |
|---|---|---|---|---|---|---|---|---|---|
| (1) INITIAL UNIQUE CODE UCp (WITHOUT CORRECTION) | 1 | 1 | 0 | 0 | 0 | 1 | 1 | 1 | ... |
| (2) BIT MASK DATA | 1 | 0 | 1 | 1 | 1 | 1 | 0 | 1 | ... |
| (3) DATA SUBJECTED TO MASK PROCESS | 1 | X | 0 | 0 | 0 | 1 | X | 1 | ... |
| (4) DELETE X PORTION AND ALIGN TO THE LEFT | 1 | 0 | 0 | 0 | 1 | 1 | ... | | |
| (5) AFTER ECC (FIRST BIT CORRECTED) | 1 | 1 | 0 | 0 | 1 | 1 | ... | | |

BIT MASK PROCESS: columns 0–7
ECC PROCESS: after bit mask

FIG. 15

| BIT POSITION | 0 | 1 | 2 | 3 | 4 | 5 | 6 | 7 | ... |
|---|---|---|---|---|---|---|---|---|---|
| (1) UNIQUE CODE UC(a) (WITHOUT CORRECTION) | 1 | 1 | 0 | 0 | 0 | 1 | 1 | 1 | ... |
| (2) MASK DATA | 1 | 0 | 1 | 1 | 1 | 1 | 0 | 1 | ... |
| (3) DATA SUBJECTED TO MASK PROCESS | 1 | x | 0 | 0 | 0 | 1 | x | 1 | ... |
| (4) DELETE X PORTION AND ALIGN TO THE LEFT | 1 | 0 | 0 | 0 | 1 | 1 | ... | | |
| (5) AFTER ECC (FIRST BIT CORRECTED) | 1 | 1 | 0 | 1 | 1 | 1 | ... | | |
| (6) COMPUTATE WITH "NOT" | 0 | 0 | 1 | 1 | 0 | 0 | ... | | |

CORRECTION DATA CD(a) (bits 5–7, ...)
COMMON KEY CK(a)

SEMICONDUCTOR DEVICE AND METHOD OF WRITING DATA TO SEMICONDUCTOR DEVICE

CROSS-REFERENCE TO RELATED APPLICATIONS

The disclosure of Japanese Patent Application No. 2011-136133 filed on Jun. 20, 2011 including the specification, drawings and abstract is incorporated herein by reference in its entirety.

BACKGROUND

The present invention relates to a semiconductor device and a method of writing data to a semiconductor device and, more particularly, to a semiconductor device holding confidential information to be kept secret from an attack from the outside and a method of writing confidential information to the semiconductor device.

In recent years, many security techniques using encryption technology for improvement in resistance to an unauthorized access to a semiconductor device or prevention of imitation are proposed. In the encryption technology, an encryption key is used. The technique, however, has a problem that when an encryption key is obtained by an attacker, an illegal access to a semiconductor device becomes possible. Consequently, information which is inconvenient when leaked such as key information is demanded to be prevented from being leaked as confidential information to the outside. Patent documents 1 to 4 disclose techniques of security measures on key information as one of confidential information. In all of the techniques of Patent documents 1 to 4, confidential information such as key information is generated by using an eigenvalue which differs according to manufacture variations of semiconductor devices such as a silicon ID or a PUF (Physically Unclonable Function). In Patent documents 1 to 4, since such an eigenvalue includes an error, in the case of generating definitive confidential information by using such an eigenvalue, error correcting process has to be performed on the eigenvalue. By generating confidential information on the basis of such an eigenvalue, it becomes unnecessary to hold the confidential information as a fixed value, the security of the semiconductor device can be improved.

RELATED ART DOCUMENTS

Patent Documents

Patent document 1: WO 2008/056612
Patent document 2: Japanese Unexamined Patent Publication No. 2006-179001
Patent document 3: Japanese Unexamined Patent Application Publication (Translation of PCT Application) No. 2010-527219
Patent document 4: Japanese Unexamined Patent Application Publication (Translation of PCT Application) No. 2008-545323

SUMMARY

For example, in the case of generating confidential information such as key information by using the PUF, to generate confidential information, the PUF is read by the semiconductor device and key information is encrypted. By decrypting data obtained by encrypting the key information to be kept secret by using the PUF in the semiconductor device, the key information can be safely stored in the semiconductor device. However, even in this case, there is the possibility that a person maintaining a system on which a semiconductor device is mounted becomes an attacker. In such a case, even when the techniques disclosed in Patent documents 1 to 4 are applied to encrypted communication among semiconductor devices, in the case where a maintenance person collects a large amount of the values of the PUF and encrypted data generated by using the PUF from a semiconductor device by a side channel attack or the like, there is the possibility that confidential information is analyzed. There is consequently a problem that, even when the techniques disclosed in Patent documents 1 to 4 are applied, the security of the semiconductor device cannot be sufficiently improved.

In a semiconductor device and a data writing method according to the present invention, a semiconductor device generates an intermediate unique code obtained by correcting an error in an initial unique code, generates a first determinate unique code obtained by correcting an error in the intermediate unique code, and decrypts transmission data sent from an external device with the first definite unique code to obtain confidential information. An external device receives an intermediate unique code generated by a semiconductor device and encrypts confidential information by using key information generated on the basis of the intermediate unique code to generate transmission data. By the operation, the semiconductor device according to the present invention can obtain encrypted confidential information without transmitting/receiving key information itself for use in encryption of transmission data. Thus, high-security communication with an external device is realized.

An external device has first correction data for use in process of correcting an error in an initial unique code in a semiconductor device, and the first correction data is stored in an encrypted state in the external device. The semiconductor device which receives the encrypted first correction data decrypts the received encrypted first correction data and generates an intermediate unique code using the decrypted first correction data. By the operation, the semiconductor device can perform higher-security communication.

An external device has a plurality of devices (for example, a writing device and a server), generates transmission data in a device (for example, the server) which is not directly coupled to the semiconductor device, and writes transmission data to the semiconductor device via a device (for example, the writing device) which is directly coupled to the semiconductor device. With the configuration, security on the external device can be improved.

Further, the external device holds first correction data to be transmitted to a semiconductor device and second correction data for use in generation of key information so as to be dispersed in a plurality of devices. With the configuration, security on the external device can be further improved.

EFFECT OF THE INVENTION

In the semiconductor device and the method of writing data to the semiconductor device according to the present invention, the security of the semiconductor device is improved.

BRIEF DESCRIPTION OF THE DRAWINGS

FIG. 2 is a table illustrating an example of determinate unique codes generated by the semiconductor device according to the first embodiment and the external device.

FIG. 15 is a table showing an example of unique codes processed by the common key generating unit in the encryption communication system illustrated in FIG. 12.

DETAILED DESCRIPTION

First Embodiment

Figure 1:
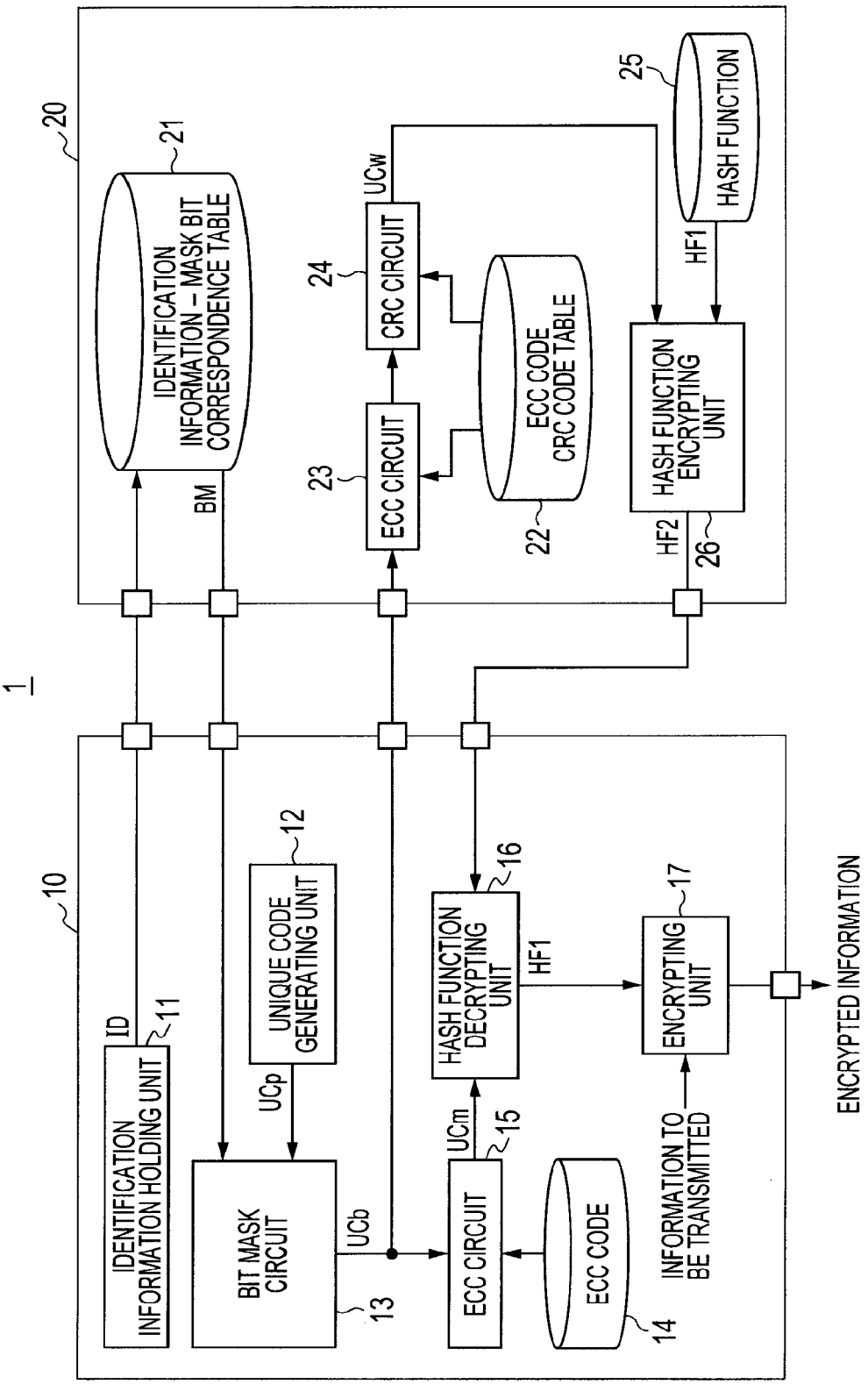
FIG. 1 is a block diagram of a semiconductor device according to a first embodiment and an external device.

Hereinafter, embodiments of the present invention will be described with reference to the drawings. FIG. 1 is a block diagram showing a semiconductor device 10 according to a first embodiment and an external device (for example, a writing device 20). As illustrated in FIG. 1, in the first embodiment, one data writing system 1 is configured by the semiconductor device 10 and the external device 20. In the semiconductor device 10, confidential information is written by using the data writing system 1, and encrypted communication is performed by using the confidential information.

As shown in FIG. 1, the semiconductor device 10 has a unique code generating unit 12, a first error correcting unit (for example, a bit mask circuit 13), a second error correcting unit (for example, an ECC circuit 15), and a decrypting unit (for example, a hash function decrypting unit 16). The semiconductor device 10 also has, as units accompanying the above-described circuits, identification information holding unit 11, a storing unit 14, and an encrypting unit 17.

The identification information holding unit 11 holds identification information ID which is preliminarily set as a fixed value for each device. The identification information holding unit 11 outputs the identification information ID to the writing device 20. The identification information ID is a value such as a lot number of a product, a product management number, or a product ID and does not include an error.

The unique code generating unit 12 generates an initial unique code UCp which is a value unique to a device and includes an error in a random bit. The unique code generating unit 12 generates the initial unique code UCp using, for example, an initial value at the time of start of a memory element (such as an SRAM (Static Random Access Memory)) in the semiconductor device 10. The initial unique code UCp is a value generated from circuits of the same design and is a code generated by using the characteristic such that circuits actually manufactured as semiconductor devices have variations. Such a technique is called a PUF (Physical Unclonable Function) and, without requiring special hardware such as a tamper-resistant chip, can realize high confidentiality of data since it is difficult to make a copy of the data.

The bit mask circuit 13 corrects an error in the initial unique code UCp to generate an intermediate unique code. More concretely, the bit mask circuit 13 corrects an error in the initial unique code UCp by first correction data (for example, bit mask data BM) obtained from the outside (for example, the writing device 20) to generate an intermediate unique code UCb. In the first embodiment, the intermediate unique code UCb is output to the ECC circuit 15 and also to the writing device 20. A bit mask process performed in the bit mask circuit 13 corresponds to a first error correcting process.

The ECC circuit 15 corrects an error in the intermediate unique code UCb to generate a first determinate unique code UCm. More concretely, the ECC circuit 15 corrects an error in the intermediate unique code UCb by applying second correction data (for example, an ECC code) which is preliminarily held to the intermediate unique code UCb to generate the first determinate unique code UCm. The process of correcting an error by the ECC code performed in the ECC circuit 15 corresponds to a second error correcting process.

The storing unit 14 stores the ECC code used in the ECC circuit 15 in the semiconductor device 10. The ECC code is a value which is written at the time of manufacturing the semiconductor device.

The hash function decrypting unit 16 decrypts transmission data HF2 received from the outside by using the first determinate unique code UCm to obtain confidential information (for example, a hash function HF1).

The encrypting unit 17 encrypts information to be transmitted. More concretely, the encrypting unit 17 performs encrypted communication by using the hash function HF1 as an encryption key. Specifically, the encrypting unit 17 encrypts information to be transmitted with the hash function HF1 to generate encrypted information and outputs the encrypted information to the outside.

As illustrated in FIG. 1, the writing device 20 has storing units 21, 22, and 25, a third error correcting unit (for example, an ECC circuit 23), a validity determining circuit (for example, a CRC circuit 24), and an encrypting unit (for example, a hash function encrypting unit 26).

The storing unit 21 holds information (for example, identification information—mask bit correspondence table) obtained by associating the identification information ID and first correction data (for example, bit mask data BM). The storing unit 21 reads the identification information ID from the semiconductor device 10 and selects the bit mask data BM corresponding to the identification information ID with reference to the identification information—mask bit correspondence table. The storing unit 21 transmits the selected bit mask data BM to the semiconductor device 10. The storing unit 21 has a configuration that it cannot transmit the bit mask data BM to the semiconductor device 10 when there is no identification information ID. The bit mask data BM is data designating a bit to be masked, in an initial unique code.

The storing unit 22 stores the ECC code and a CRC (Cyclic Redundancy Check) code table. The ECC code is the same as that stored in the storing unit 14 in the semiconductor device 10. The CRC code table is generated in advance in correspondence with the first determinate unique code UCm generated by the semiconductor device 10.

The ECC circuit 23 reads the ECC code from the storing unit 22 and performs the process of correcting an error in the read ECC code on the intermediate unique code transmitted from the semiconductor device 10. That is, in the ECC circuit 23, the same error correcting process as that in the ECC circuit 15 in the semiconductor device 10 is performed. By the process, the ECC circuit 23 generates a second determinate unique code UCw obtained by correcting an error in the intermediate unique code UCb. The second determinate unique code UCw is used as key information used for encrypting confidential information to be transmitted.

The CRC circuit reads a CRC code corresponding to the first determinate unique code UCm from the CRC code table in the storing unit 22. The CRC circuit 24 checks an error in the second determinate unique code UCw by using the CRC code. When an error is recognized in the second determinate unique code UCw, the CRC circuit 24 determines that the second determinate unique code UCw is invalid. When no error is detected in the second determinate unique code UCw, it is determined that the second determinate unique code UCw is valid. Only when the second determinate unique code UCw is valid, the CRC circuit 24 outputs the second determinate unique code UCw to a circuit on the post stage. On the other hand, in the case where the second determinate unique code UCw is invalid, the CRC circuit 24 performs a process of stopping the operation of the writing device 20. When it is determined that the second determinate unique code UCw is invalid, the CRC circuit 24 may repeat the error check on the second determinate unique code UCw with a limit of a predetermined number of times until the code is determined valid.

In the storing unit 25, the hash function HF1 as confidential information is stored. The hash function encrypting unit 26 reads the hash function HF1 from the storing unit 25 and encrypts the hash function HF1 with the second determinate unique code UCw to generate the transmission data HF2. The hash function encrypting unit 26 transmits the transmission data HF2 to the semiconductor device 10.

Determinate unique codes generated by the semiconductor device according to the first embodiment and an external device will be described. FIG. 2 is a table illustrating an example of determinate unique codes generated by the semiconductor device according to the first embodiment and an external device.

First, the semiconductor device 10 generates an initial unique code UCp from the unique code generating unit 12 ((1) in FIG. 2). Next, the bit mask circuit 13 performs a bit mask process of masking a predetermined bit on the initial unique code UCp by using the bit mask data BM. The bit mask data BM is data designating a bit to be masked, in an initial unique code. A bit to be masked is determined by the error rate of bits of the initial unique code UCp. In the embodiment, as a bit designated as a bit to be masked in the bit mask data BM, a bit of the initial unique code UCp having high error rate is set. In the example of FIG. 2, the first and sixth bits of the initial unique code UCp have the high error rate, so that the bit mask data BM is "0". Since the other bits are bits having low error rate or having stable value, the bit mask data BM is "1". That is, the bit mask data BM of a bit which has to be masked is "0", and mask data of a bit which does not have to be masked is "1". By masking the initial unique code UCp with the bit mask data BM, data (such as the intermediate unique code UCb) subjected to a mask process of deleting the first and sixth bits in the initial unique code UCp can be obtained (the bits deleted by the mask process are indicated by "X"). After that, the intermediate unique code UCb generated by the mask process is aligned to the left. The error rate in this case is a value in which the data of a bit changes "0" or "1" at predetermined high probability each time the initial unique code UCp is generated, and the initial unique code UCp also includes a bit of low error rate.

Next, an error in the intermediate unique code UCb is corrected with the ECC code (Error Checking and Correction code). In the example shown in FIG. 2, by the error correcting process (hereinbelow, called ECC process) using the ECC code, the second bit is corrected from "0" to "1". A unique code generated by the ECC process is a first determinate unique code UCm or a second determinate unique code UCw.

Figure 3:
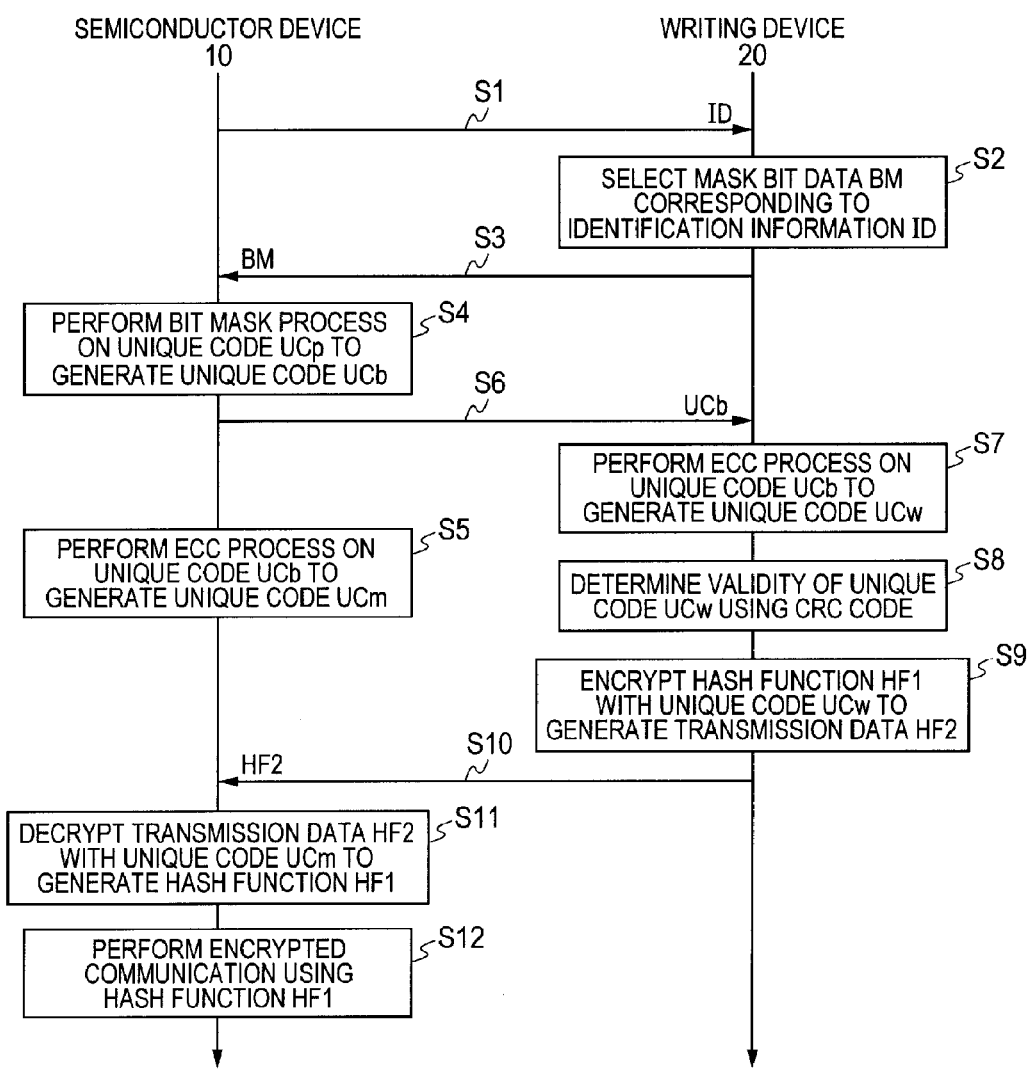
FIG. 3 is a sequence diagram showing the operation of the semiconductor device according to the first embodiment and the external device.

The operation of the semiconductor device 10 and the writing device 20 in the data writing system 1 according to the first embodiment will be described. FIG. 3 is a sequence diagram showing the operation of the semiconductor device 10 according to the first embodiment and the writing device 20.

As illustrated in FIG. 3, in the data writing system 1 according to the first embodiment, first, the writing device 20 obtains the identification information ID from the semiconductor device 10 (step S1). The writing device 20 selects the bit mask data BM corresponding to the received identification information ID from the data in the storing unit 21 (step S2). Subsequently, the writing device 20 transmits the selected bit mask data BM to the semiconductor device 10 (step S3).

The semiconductor device 10 performs the bit mask process on the initial unique code UCp with the bit mask data BM received from the writing device 20 to generate the intermediate unique code UCp (step S4). After that, the semiconductor device 10 transmits the intermediate unique code UCb to the ECC circuit 15 and the writing device 20 in the semiconductor device (step S6).

In the semiconductor device 10, the ECC circuit 15 applies an ECC code stored in the storing unit 14 to the intermediate unique code UCb and performs the process of correcting an error in the intermediate unique code UCb. The ECC circuit 15 generates the first determinate unique code UCm (step S5).

On the other hand, in the writing device 20, the ECC circuit 23 applies an ECC code stored in the storing unit 22 to the intermediate unique code UCb and performs the process of correcting an error in the intermediate unique code UCb. The ECC circuit 23 generates the second determinate unique code UCw (step S7). Subsequently, the writing device 20 verifies validity of the second determinate unique code UCw by using the CRC code stored in the storing unit 22 (step S8). In the case where it is determined in step S8 that the second determinate unique code UCw is valid, the hash function encrypting unit 26 encrypts the hash function HF1 with the second determinate unique code UCw by applying the second determinate unique code UCw of the CRC circuit 24 to generate the transmission data HF2 (step S9). The writing device 20 transmits the generated transmission data HF2 to the semiconductor device 10 (step S10). In the case where it is determined in step S8 that the second determinate unique code UCw is invalid, the writing device 20 stops the process.

Subsequently, the semiconductor device 10 decrypts the received transmission data HF2 with the first determinate unique code UCm generated in step S5 to generate the hash function HF1 (step S11). The semiconductor device 10 starts encrypted communication with another semiconductor device using the hash function HF1 (step S12).

In the semiconductor device according to the first embodiment, by obtaining the encrypted confidential information (for example, the hash function HF1) from the writing device 20 and decrypting the transmission data HF2 with the first determinate unique code UCm generated in the semiconductor device, the usable hash function HF1 can be obtained. By applying encrypted information as data to be transmitted from the writing device 20 to the semiconductor device 10, security is maintained on confidential information, and the confidential information can be written in the semiconductor device 10. However, only by applying the general encrypted communication in related arts to writing of confidential information to the semiconductor device 10, there is a problem that the security cannot be maintained.

As general techniques of the encrypted communication, there are the public key method of providing a transmission-side device transmitting confidential information with a public key and providing a reception-side device receiving confidential information with a secret key and a common key method of using a common key between devices performing communications. In the case of employing the public key method as an encrypting method, a secret key is stored in advance in a semiconductor device as a reception-side device and a public key has to be pre-stored in a writing device as a transmission-side device. In the case of employing the public key method, it is unnecessary to receive/transmit key information between the semiconductor device and the writing device, so that there is an advantage that leakage of the key information in communication between the semiconductor device and the writing device can be prevented. However, the semiconductor device has a problem in management of a secrete key since a distribution amount of the semiconductor device is much larger than that of the writing device. In the case of employing the common key method as an encrypting method, by pre-storing a common key in both of a semiconductor device and a writing device, there is an advantage that leakage of key information in the communication between the semiconductor device and the writing device can be prevented. However, in the case of employing the common key method, there is a problem such that the measure of preventing leakage of the common key has to be taken in both of a semiconductor device and a writing device. In the case of employing the public key method, in addition to general measures of preventing leakage of key information, there is also a case that a measure of preventing theft of a writing device is also necessary.

Particularly, in the case where the semiconductor device 10 is an in-vehicle semiconductor device mounted on a vehicle, it is difficult to fully maintain the above-described security measure. Maintenance is generally necessary for vehicles and, in the maintenance, there is the case that a maintenance person operates a writing device. There is a risk that any of maintenance persons is an attacker. Since the writing device is disposed not only in a factory of a car maker but also in car dealers and the like, it is difficult to completely prevent stealing of the writing devices in all of the places.

Methods of analyzing a general semiconductor device and illegally obtaining data include (1) a method of processing a semiconductor device with an FIB (Focused Ion Beam) and physically analyzing the semiconductor device with a probe, (2) fault tree analysis of making a CPU run away by irradiating a semiconductor device with an electromagnetic wave such as a laser beam or making noise in a power supply terminal to illegally obtain data, (3) a leak analysis of observing the consumption current amount of a semiconductor device and analyzing key data, and (4) a method of directly coupling to a signal terminal of a semiconductor device to read signal information.

To avoid such illegal analysis, in fields requiring high security level, a microcomputer having high security level (hereinbelow, called secure microcomputer) is used. The secure microcomputer is provided with a shield against a wiring region, a function of detecting light and signal noises, a function of scattering current by combining a random number signal with a signal, and the like.

As described above, by using a secure microcomputer, illegal analysis on a semiconductor device by a third party can be prevented. However, in the case of using the secure microcomputer, although the illegal analysis can be prevented, problems occur such that a semiconductor device manufacturer and the like cannot perform a failure analysis and a breakdown analysis due to the tamper resistance characteristic. In particular, since an in-vehicle microcomputer (such as ECU) for use in a car needs high reliability, the failure analysis and the breakdown analysis on the semiconductor device are necessary. For such a reason, a general microcomputer (hereinbelow, called general microcomputer) whose security level is lower than that of a secure microcomputer is widely used as the in-vehicle microcomputer. In an in-vehicle microcomputer in related art, an encrypted communication system with improved security level of a semiconductor device while using a general microcomputer is in demand.

By the semiconductor device and the method of writing data to the semiconductor device according to the first embodiment, the problem can be solved. In the semiconductor device 10 according to the first embodiment, a first error correcting process (for example, bit mask process) is performed on the initial unique code UCp to generate the intermediate unique code UCb. The semiconductor device 10 according to the first embodiment transmits the intermediate unique code UCb to the ECC circuit 15 in the semiconductor device 10 and also to the writing device 20. In the semiconductor device 10, a second error correcting process (for example, error correcting process with an ECC code) is performed on the intermediate unique code UCb in the ECC circuit 15 to generate the first determinate unique code UCm. The writing device 20 performs the same error correcting process as the second error correcting process on the intermediate unique code UCb by the ECC circuit 23 to generate the second determinate unique code UCw, and encrypts the hash function HF1 using the second determinate unique code UCw as key information to generate the transmission data HF2. The semiconductor device 10 decrypts the transmission data HF2 with the first determinate unique code UCm to generate the hash function HF1. That is, to obtain the hash function HF1 from the writing device 20, the semiconductor device 10 according to the first embodiment does not have to directly transmit/receive key information and the hash function HF1 in communication with the writing device 20. Consequently, the semiconductor device 10 according to the first embodiment can prevent leakage of the hash function HF1 as confidential information and key information used for the process of encrypting/decrypting the hash function HF1 and can enhance security.

The semiconductor device 10 according to the first embodiment generates key information for use in decryption of the hash function HF1 from the initial unique code UCp (for example, PUF). In the case of generating key information from the initial unique code UCp, the semiconductor device 10 according to the first embodiment has to use first correction data (for example, bit mask data BM) and second correction data (for example, ECC data). However, in the semiconductor device according to the first embodiment, the bit mask data BM is given from the outside of the semiconductor device 10. Due to this, in the semiconductor device according to the first embodiment, even when the ECC code and the initial unique code UCp are found out by illegal act of analysis or the like, the first determinate unique code UCm cannot be specified. Therefore, the semiconductor device 10 according to the first embodiment can prevent leakage of key information caused by an illegal access and realize high security.

In the data writing system 1 of the first embodiment, when the writing device 20 does not have the bit mask data BM corresponding to the recognition information ID of the semiconductor device 10, the bit mask data BM is not transmitted to the semiconductor device 10. Consequently, even if a fake writing device transmits a fake hash function having malicious intent to the semiconductor device 10, only a fake first determinate unique code different from the original first determinate unique code UCm is generated in the semiconductor device 10, and the semiconductor device 10 cannot generate a hash function normally. Further, in the case where the writing device is a fake, the ECC code is different from the original ECC code so that the second determinate unique code UCw generated on the writing device side and the first determinate unique code UCm generated on the semiconductor device side do not match. For such a reason, transmission data generated by the fake writing device cannot normally perform the decrypting process on the semiconductor device side. Therefore, the semiconductor device 10 according to the first embodiment can prevent writing of a hash function having malicious intent from a fake writing device.

In the semiconductor device 10 according to the first embodiment, even in the case where leakage of stored data such as the identification information ID, the initial unique code UCp, and the ECC code in the semiconductor device 10 occurs due to an illegal access, the hash function HF1 as confidential information or the first determinate unique code UCm used for the process of decrypting the hash function HF1 cannot be recognized only by the leaked data. Consequently, the semiconductor device 10 according to the first embodiment can be realized by a general microcomputer or the like without using an expensive semiconductor device such as a secure microcomputer. Further, since the semiconductor device 10 can be realized by a general microcomputer, a failure in the semiconductor device 10 can be easily analyzed by a regular maintenance person.

In the data writing system 1 according to the first embodiment, in communication between the semiconductor device 10 and the writing device 20, transmission/reception data is the identification information ID of the semiconductor device 10, one of a plurality of pieces of correction data necessary to generate the first determinate unique code UCm, the first determinate unique code UCm to be subjected to the error correcting process (that is, the intermediate unique code UCb), and the encrypted hash function HF1 (that is, the transmission data HF2). In the data writing system 1 according to the first embodiment, in communication between the semiconductor device 10 and the writing device 20, the hash function HF1 as confidential information and the first determinate unique code UCm used for decryption are not directly transmitted/received. Therefore, in the data writing system 1 according to the first embodiment, even in the case where intercept or the like of a signal is made on the communication path between the semiconductor device 10 and the writing device 20, confidential data or data directly used for reproducing confidential information is not leaked. Thus, the data writing system 1 according to the first embodiment can realize high security on the communication path between the semiconductor device 10 and the writing device 20.

In the semiconductor device 10 and the writing device 20 according to the first embodiment, by a process of comparing the first determinate unique code UCm and the second determinate unique code UCw, authentication between the semiconductor device 10 and the writing device 20 can be performed. That is, the semiconductor device 10 and the writing device 20 according to the first embodiment can perform the authentication process without performing a complicated calculation such as RSA encryption. Consequently, the semiconductor device 10 and the writing device 20 according to the first embodiment can realize high security of the data writing system 1 only by a process of simple calculation.

In the data writing system 1 according to the first embodiment, in the case where the writing device 20 is stolen, there is the possibility that the bit mask data BM and the ECC code stored in the writing device 20 are leaked. It is however very difficult to derive the first determinate unique code UCm only by the leaked data. Therefore, the data writing system 1 according to the first embodiment produces an effect that it is unnecessary to implement a high-level anti-theft measure on the writing device 20. In consideration of the anti-theft measure, confidential information (for example, the hash function HF1) stored in the writing device 20 is preferably entered at the time of use or held in a state where an information leakage preventing measure is taken.

In the writing device 20 according to the first embodiment, in the case where a fake semiconductor device is coupled, the first determinate unique code UCm to be subjected to the error correcting process (that is, the intermediate unique code UCb) transmitted from the fake semiconductor device to the writing device 20 is different, so that the second determinate unique code UCw generated by the ECC circuit 23 in the writing device cannot be generated correctly. Consequently, by the validity determining process performed by the CRC circuit 24, the fake semiconductor device can be found. That is, the writing device 20 according to the first embodiment can prevent spread of imitations of the semiconductor device 10.

Usually, confidential information used by the semiconductor device 10 is a confidential matter for the user of the semiconductor device 10. To store such a confidential matter while maintaining high security in the semiconductor device, the user has to preliminarily supply confidential information to a semiconductor maker. From the viewpoint of users, there is consequently a problem such that leakage prevention management on the confidential information cannot be sufficiently performed. However, by using the semiconductor device 10 and the writing device 20 according to the first embodiment, the user can directly write confidential information to the semiconductor device 10 with the writing device 20. That is, by using the semiconductor device 10 and the writing device 20 according to the first embodiment, certainty of leakage prevention management on confidential information in the user can be improved. On the other hand, the semiconductor maker has to provide the bit mask data BM and the ECC code corresponding to the semiconductor device 10 to the user. It is however difficult to derive the first determinate unique code UCm by only the provided data. That is, also in the semiconductor maker, a high-level leakage measure on the bit mask data BM and the ECC code is unnecessary.

The above-described CRC circuit can be replaced by a circuit (such as a parity check circuit) capable of executing a process of detecting an error in data to be processed or preventing erroneous correction. The ECC circuit can be also replaced by a circuit having another configuration capable of correcting an error in data to be processed.

Second Embodiment

Figure 4:
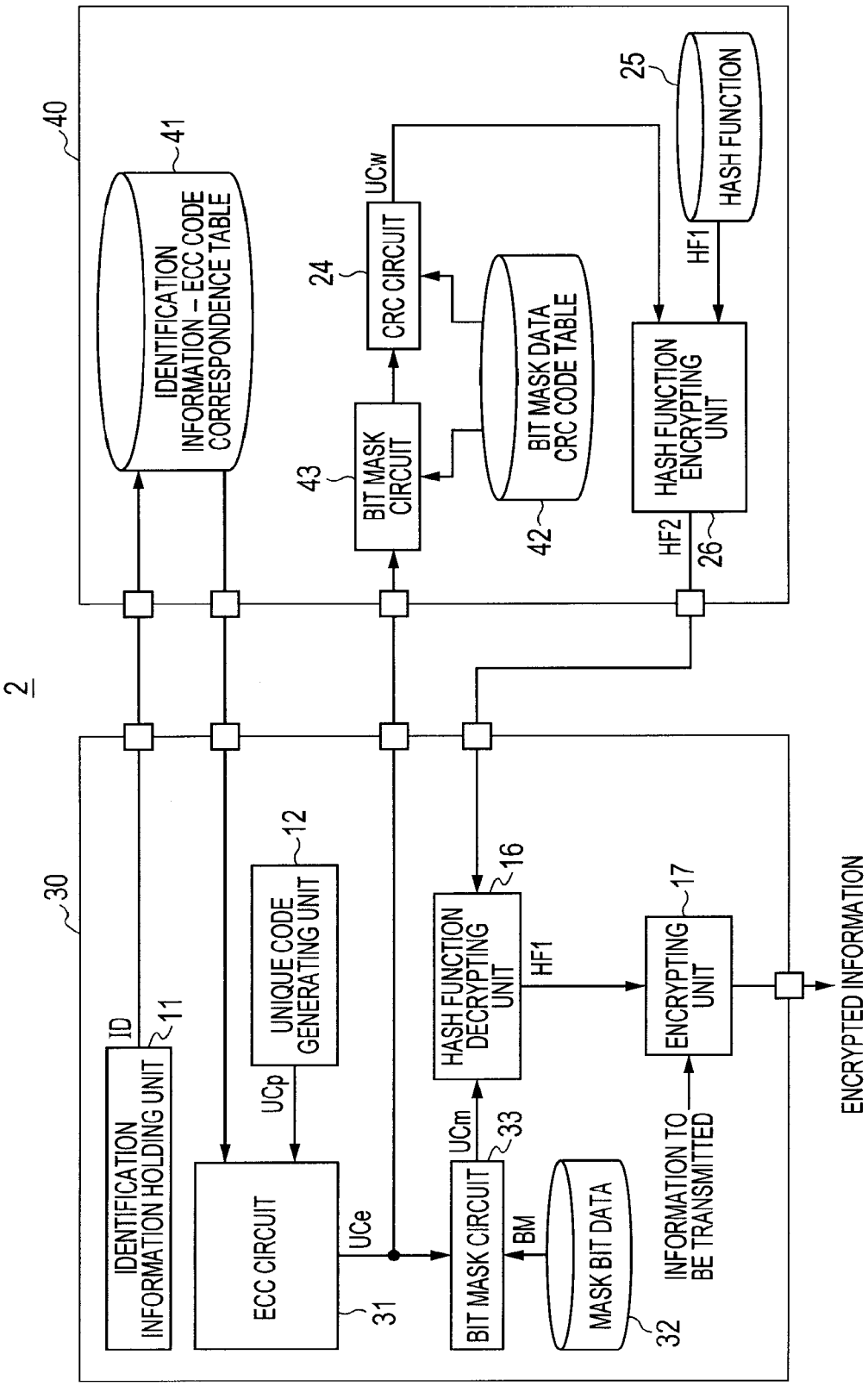
FIG. 4 is a block diagram of a semiconductor device according to a second embodiment and an external device.

FIG. 4 is a block diagram of a semiconductor device 30 according to a second embodiment and an external device (for example, a writing device 40). As shown in FIG. 4, in the second embodiment, a data writing system 2 is configured by the semiconductor device 30 and the writing device 40. In the description of the second embodiment, the same reference numerals as those of the first embodiment are designated to the same components as those of the first embodiment, and their description will not be repeated.

As shown in FIG. 4, the semiconductor device 30 has an ECC circuit 31 as a first data correcting unit in the semiconductor device 10 according to the first embodiment, and a bit mask circuit 33 as a second data correcting unit. In the semiconductor device 30, bit mask data BM is used as second correction data used in the second data correcting unit. In FIG. 4, a storing unit 32 is shown as a region storing the bit mask data BM. In FIG. 4, the reference characters UCe are designated to an intermediate unique code generated by the ECC circuit 31.

As shown in FIG. 4, as the semiconductor device 10 is changed to the semiconductor device 30, the error correcting unit which generates the second determinate unique code UCw is changed from the ECC circuit 23 to the bit mask circuit 43. Consequently, the writing device 40 has a storing unit 42 as a region storing bit mask data and a CRC code table in place of the storing unit 22. In the writing device 40, as the first error correcting unit in the semiconductor device is changed from the bit mask circuit 13 to the ECC circuit 31, error correction data associated with the identification information ID is changed to the ECC code. Accordingly, in the writing device 40, in place of the identification—mask bit correspondence table, an identification information—ECC code correspondence table is stored. In FIG. 4, as the region storing the identification information—ECC code correspondence table, a storing unit 41 is shown. In the case of receiving the identification information ID, the storing unit 41 outputs an ECC code corresponding to the identification information ID. The ECC code is a code which is preliminarily generated in correspondence with the initial unique code UCp. Also by correcting an error in an intermediate unique code generated by another semiconductor device with the ECC code, a determinate unique code generated becomes different from the first determinate unique code UCm generated by the semiconductor device 10.

Figure 5:
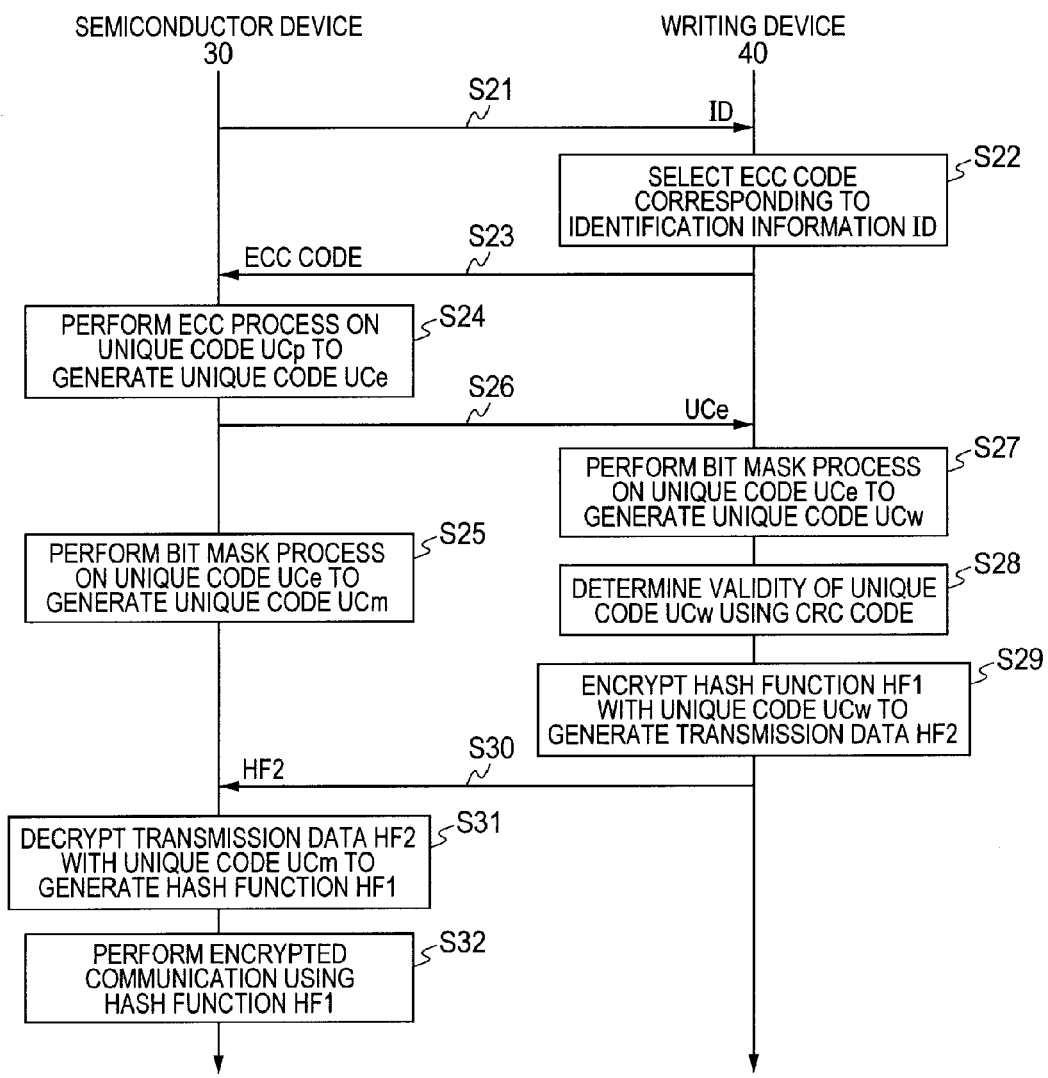
FIG. 5 is a sequence diagram showing the operation of the semiconductor device according to the second embodiment and the external device.

The operation of the semiconductor device 30 according to the second embodiment and the writing device 40 will be described. FIG. 5 is a sequence diagram showing the operation of the semiconductor device 30 according to the second embodiment and the writing device 40.

As illustrated in FIG. 5, in the data writing system 2 according to the second embodiment, first, the writing device 40 obtains the identification information ID from the semiconductor device 30 (step S21). The writing device 40 selects an ECC code corresponding to the received identification information ID from the data in the storing unit 41 (step S22). Subsequently, the writing device 40 transmits the selected ECC code to the semiconductor device 30 (step S23).

The semiconductor device 30 performs an error correcting process on the initial unique code UCp with the ECC code received from the writing device 40 to generate an intermediate unique code UCe (step S24). After that, the semiconductor device 30 transmits the intermediate unique code UCe to the bit mask circuit 33 and the writing device 40 in the semiconductor device (step S26).

In the semiconductor device 30, the bit mask circuit 33 applies the bit mask data BM stored in the storing unit 32 to the intermediate unique code UCe and performs the process of correcting an error in the intermediate unique code UCe. The bit mask circuit 33 generates the first determinate unique code UCm (step S25).

On the other hand, in the writing device 40, the bit mask circuit 43 applies the bit mask data BM stored in the storing unit 42 to the intermediate unique code UCe and performs the process of correcting an error in the intermediate unique code UCe. The bit mask circuit 43 generates the second determinate unique code UCw (step S27). Subsequently, the writing device 40 transmits the second determinate unique code generated by the bit mask circuit 43 to the CRC circuit 24 and verifies validity of the second determinate unique code UCw by using the CRC code stored in the storing unit 42 (step S28). In the case where it is determined in step S28 that the second determinate unique code UCw is valid, the writing device 40 encrypts the hash function HF1 with the second determinate unique code UCw in the hash function encrypting unit 26 to generate the transmission data HF2 (step S29). The writing device 40 transmits the generated transmission data HF2 to the semiconductor device 30 (step S30). In the case where it is determined in step S28 that the second determinate unique code UCw is invalid, the writing device 40 stops the process.

Subsequently, the semiconductor device 30 decrypts the received transmission data HF2 with the first determinate unique code UCm generated in step S25 to generate the hash function HF1 (step S31). The semiconductor device 30 starts encrypted communication with another semiconductor device using the hash function HF1 (step S32).

As described above, in the second embodiment, the order of the first error correcting process and the second error correcting process is opposite to that of the first embodiment. Also in the case where the order of the processes is opposite, key information and confidential information is not directly transmitted/received between the semiconductor device 30 and the writing device 40. Consequently, in a manner similar to the first embodiment, also in the second embodiment, key information and confidential information is prevented from being leaked, and high security can be realized.

The basic nature of the data transmitted/received between the semiconductor device 30 and the writing device 40 is the same as that in the first embodiment. Therefore, in a manner similar to the first embodiment, also in the second embodiment, security in the viewpoint of the measure against an imitation of the semiconductor device, the measure against theft of the writing device, the measure against leakage of confidential information and the like can be improved.

Third Embodiment

Figure 6:
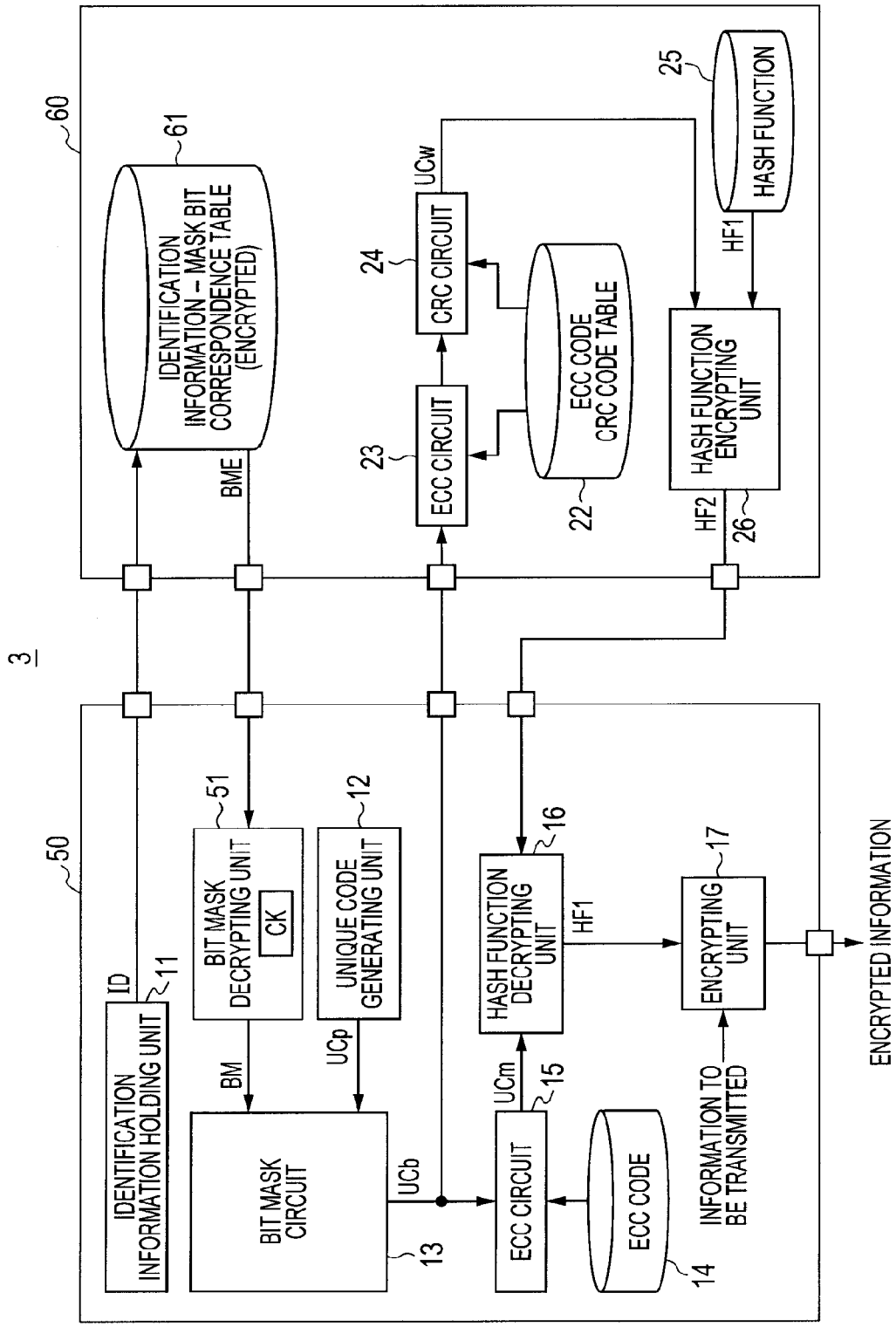
FIG. 6 is a block diagram of a semiconductor device according to a third embodiment and an external device.

FIG. 6 is a block diagram of a semiconductor device 50 according to a third embodiment and an external device (for example, a writing device 60). As shown in FIG. 6, in the third embodiment, a data writing system 3 is configured by the semiconductor device 50 and the writing device 60. In the description of the third embodiment, the same reference numerals as those of the first embodiment are designated to the same components as those of the first embodiment, and their description will not be repeated.

As shown in FIG. 6, according to the third embodiment, the semiconductor device 60 holds the identification—bit mask correspondence table in an encrypted state. In FIG. 6, a region having the encrypted identification information—bit mask correspondence table is shown as a storing unit 61. In the case of receiving the identification information ID, the storing unit 61 outputs bit mask data BME subjected to encrypting process corresponding to the identification information ID. The bit mask data BME is, for example, encrypted by the common key method. The process of encrypting the bit mask data is performed before the data is stored in the storing unit 61. The reason is that, by not holding information of a common key CK in the writing device 60, the confidentiality of the bit mask data is increased.

As shown in FIG. 6, the semiconductor device 50 according to the third embodiment is obtained by adding a bit mask decrypting unit 51 to the semiconductor device 10 according to the first embodiment. The bit mask decrypting unit 51 holds the information of the common key CK used for encrypting the bit mask data. The bit mask decrypting unit 51 decrypts the encrypted bit mask data BME with the common key CK to generate the bit mask data BM which is not encrypted, and sends the bit mask data BM to the bit mask circuit 13.

The operation of the data writing system 3 according to the third embodiment is different from that of the data writing system 1 according to the first embodiment with respect to only the point that a bit mask data decrypting process is added. Consequently, it will not be described here.

As described above, the writing device 60 according to the third embodiment holds correction data used for the first error correcting process of the semiconductor device 50 in an encrypted state. Consequently, the writing device 60 according to the third embodiment has increased confidentiality of the first correction data (for example, bit mask data) even in the case where the writing device 60 is stolen.

Identification information ID can be used as the key used for decrypting the bit mask data stored in the storing unit 61. In this case, the bit mask decrypting unit 51 in the semiconductor device 50 is unnecessary. The storing unit 61 recognizes bit mask data which is correctly decrypted as data corresponding to the identification information ID and transmits the decrypted bit mask data BM to the semiconductor device 50.

Fourth Embodiment

Figure 7:
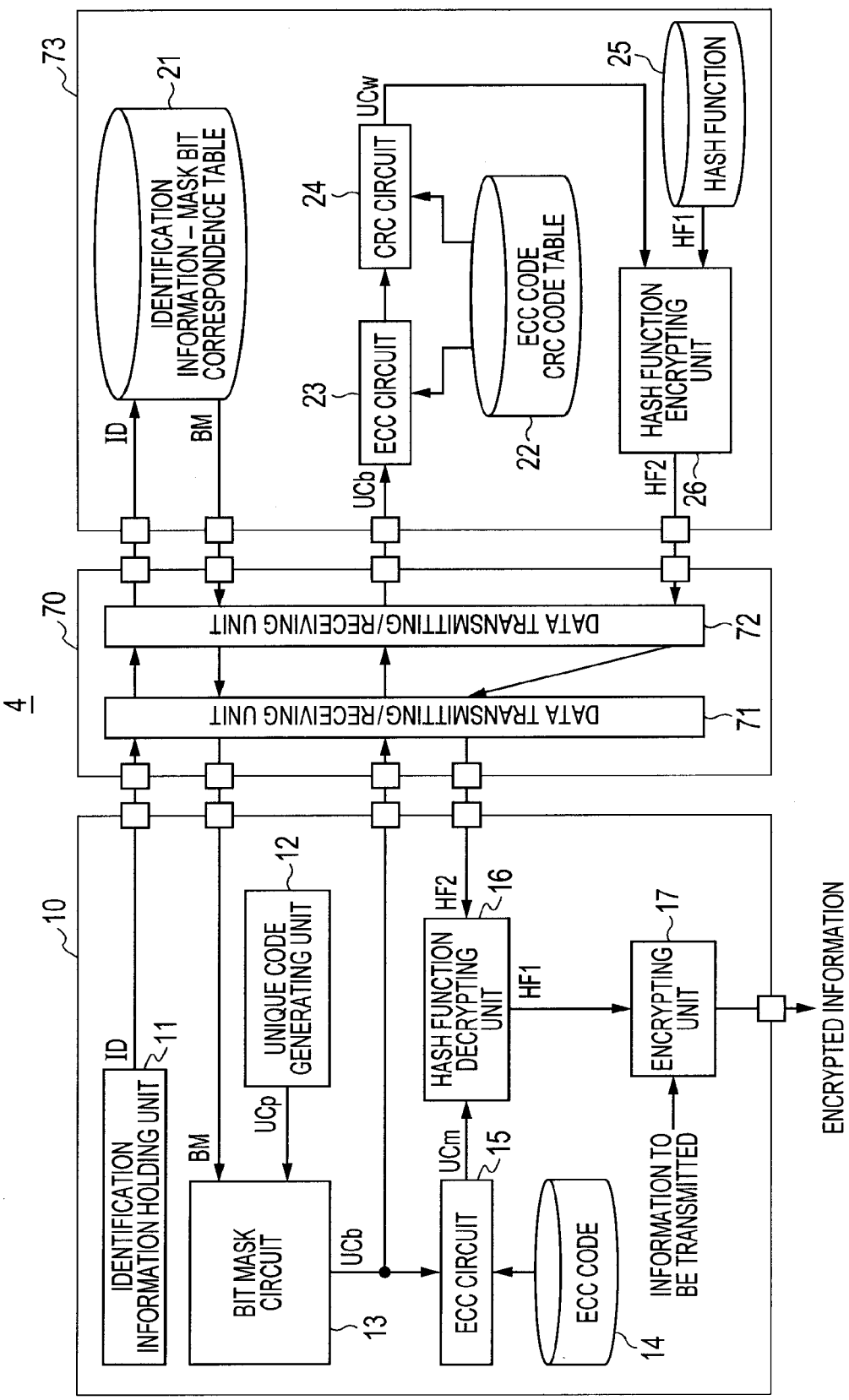
FIG. 7 is a block diagram of a semiconductor device according to a fourth embodiment and an external device.

FIG. 7 is a block diagram of the semiconductor device 10 according to a fourth embodiment and an external device. As shown in FIG. 7, in the fourth embodiment, the external device is configured by a writing device 70 and a server 73. In the fourth embodiment, a data writing system 4 is configured by the semiconductor device 10, the writing device 70, and the server 73. In the fourth embodiment, the same reference numerals as those of the first embodiment are designated to the same components as those of the first embodiment and their description will not be repeated.

In the fourth embodiment, transmission data HF2 to be written in the semiconductor device 10 is generated by the server 73. The semiconductor device 10 and the server 73 are coupled to each other via, for example, a public network. The writing device 70 intermediates the communication between the semiconductor device 10 and the server 73.

The writing device 70 has data transmitting/receiving units 71 and 72. The data transmitting/receiving unit 71 is an interface circuit with the semiconductor device 10 and operates on the basis of a protocol which can transmit/receive data to/from the semiconductor device 10. The data transmitting/receiving unit 71 performs communication with the data transmitting/receiving unit 72. The data transmitting/receiving unit 72 performs operation on the basis of a protocol which transmit/receive data to/from the server 73. Although the writing device 70 is configured by two data transmitting/receiving units in the embodiment, the writing device 70 may be configured by one data transmitting/receiving unit.

The server 73 has all of functional blocks of the writing device 20 according to the first embodiment and performs operation which is substantially the same as that of the writing device 20.

As described above, the function of generating the transmission data HF2 obtained by encrypting confidential information on the basis of the intermediate unique code UCb does not have to exist in a place where process of writing data to the semiconductor device 10 is performed.

In the data writing system 4 according to the fourth embodiment, process of generating the transmission data HF2 on the basis of the intermediate unique code UCb is performed by the server 73. The server 73 may be installed in any place as long as communication can be performed via a public network or a dedicated line in the place. Therefore, the server 73 can be installed in a place where the user (for example, a car manufacturer) of the semiconductor device 10 can directly manage the server 73, and the writing device 70 can be installed in a maintenance factory or the like. In such a manner, the user of the semiconductor device 10 can manage confidential information more directly. Even in the case where the writing device 70 is stolen, information to be kept secret does not exist in the writing device 70, so that data leakage can be prevented. Thus, in the data writing system 4 according to the fourth embodiment, the security can be increased more than the other embodiments.

Fifth Embodiment

Figure 8:
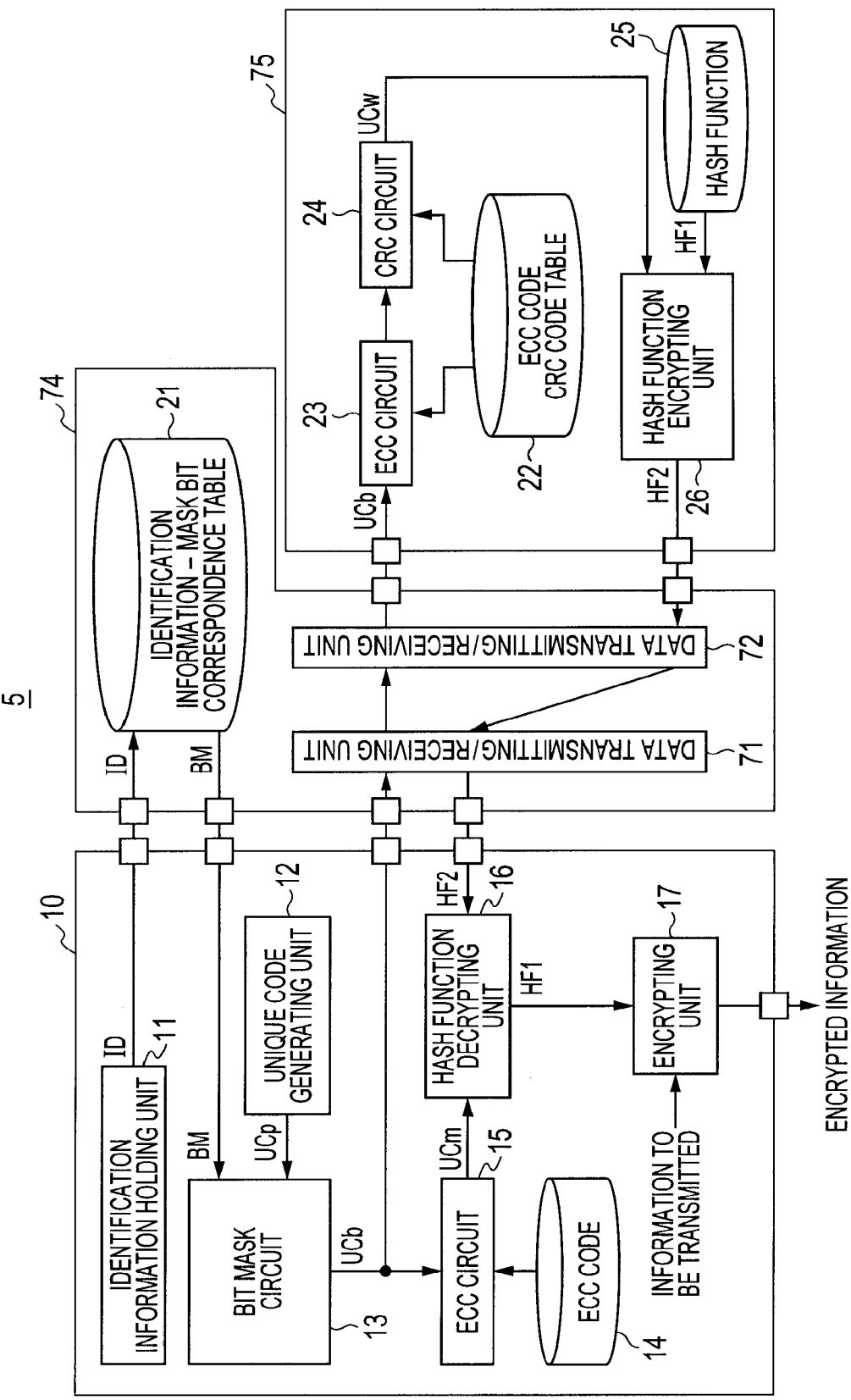
FIG. 8 is a block diagram of a semiconductor device according to a fifth embodiment and an external device.

FIG. 8 is a block diagram of the semiconductor device 10 according to a fifth embodiment and an external device. As shown in FIG. 8, in the fifth embodiment, the external device is configured by a writing device 74 and a server 75. In the fifth embodiment, a data writing system 5 is configured by the semiconductor device 10, the writing device 74, and the server 75. As shown in FIG. 8, the fifth embodiment is a modification of the fourth embodiment. In the following, the different points between the fourth and fifth embodiments will be mainly described.

The data writing system 5 according to the fifth embodiment has, as the writing device 70, the writing device 74 including the storing unit 21 which stores the bit mask data BM. The data writing system 5 according to the fifth embodiment also has the server 75 obtained by eliminating the storing unit 21 storing the bit mask data BM from the server 73. That is, in the fifth embodiment, the configuration of the writing device 20 according to the first embodiment which generates the transmission data HF2 obtained by encrypting confidential information on the basis of the intermediate unique code UCb is divided to the writing device 74 and the server 75. Also in the case where the configuration of the writing device 20 according to the first embodiment is divided, the data writing system 5 according to the fifth embodiment can perform the same process as that of the data writing system according to the first embodiment. That is, the data writing system 5 according to the fifth embodiment can realize high security like the data writing system 1 according to the first embodiment.

Like the data writing system 4 according to the fourth embodiment, the data writing system 5 according to the fifth embodiment uses the server as an external device. Consequently, the security can be increased also in the fifth embodiment like in the fourth embodiment.

Sixth Embodiment

Figure 9:
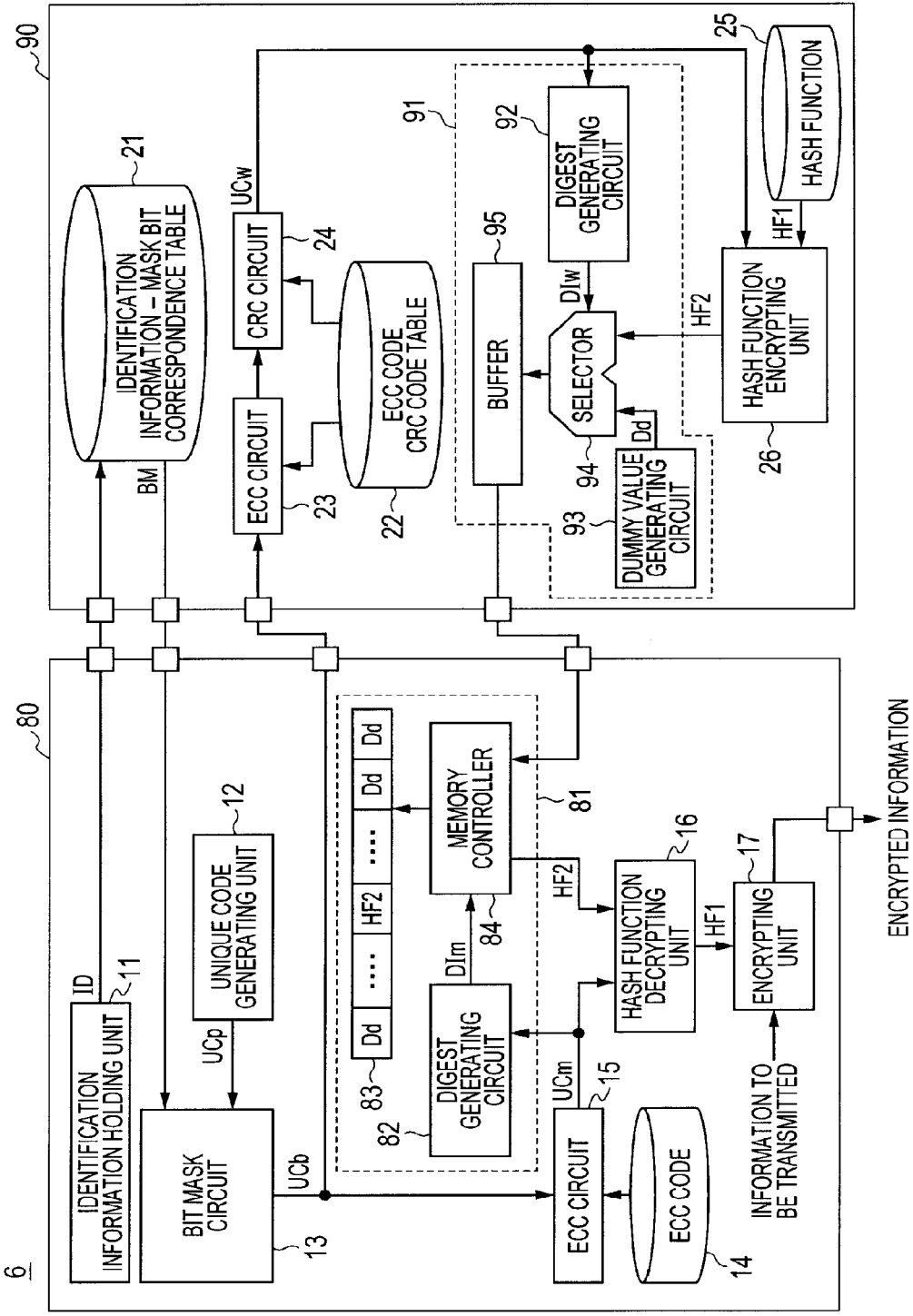
FIG. 9 is a block diagram of a semiconductor device according to a sixth embodiment and an external device.

FIG. 9 is a block diagram of a semiconductor device 80 according to a sixth embodiment and an external device (for example, a writing device 90). As shown in FIG. 9, a data writing system 6 according to the sixth embodiment is configured by the semiconductor device 80 and the writing device 90. In the description of the sixth embodiment, the same reference numerals as those of the first embodiment are designated to the same components as those of the first embodiment and their description will not be repeated.

As shown in FIG. 9, the semiconductor device 80 is obtained by adding a write information storing unit 81 to the semiconductor device 10 according to the first embodiment. The writing device 90 is obtained by adding a write information generating unit 91 to the writing device 20 according to the first embodiment. In the data writing system 6 according to the sixth embodiment, the write information generating unit 91 generates write information obtained by merging the transmission data HF2 and a dummy value Dd which increases confidentiality of the transmission data HF2. The semiconductor device 80 holds the write information generated by the write information generating unit 91 in the write information storing unit 81, and reads the transmission data HF2 from the write information storing unit 81 by using the first determinate unique code UCm. In the following, particularly, the write information storing unit 81 and the write information generating unit 91 will be described.

The write information storing unit 81 has a unique code correspondence information generating unit (for example, a digest generating unit 82), a memory region 83, and a memory controller 84.

The digest generating unit 82 generates unique code correspondence information (for example, a digest value DIm) from the first determinate unique code UCm. In the sixth embodiment, the digest generating unit 82 is used as the unique code correspondence information generating unit. As the unique code correspondence information generating unit, any circuit can be used as long as it generates information uniquely corresponding to an address value from the first determinate unique code UCm, and a circuit operating under an algorithm other than that of the digest generating unit.

In the memory region 83, the transmission data HF2 obtained by encrypting confidential information is stored in a region associated with the digest value DIm (for example, in the case where the digest value DIm is an address to be accessed, a region indicated by the digest value DIm). The memory region 83 is a nonvolatile memory such as a flash memory and is a storage holding stored information even when the power supply is interrupted.

The memory controller 84 generates an address for accessing the memory region 83 on the basis of the digest value DIm and reads information from a region corresponding to the address. In the case where there is a write instruction from the writing device 90, the memory controller 84 writes information in the memory region 83 in accordance with the write instruction.

More concretely, the transmission data HF2 stored in the write information storing unit 81 is generated by the writing device 90. At the time of writing the transmission data HF2, the writing device 90 issues a write instruction by merging the dummy value Dd and the transmission data HF2. The writing device 90 designates, as a write address of the transmission data HF2, a digest value DIw of the second determinate unique code UCw as a region storing the transmission data HF2. The memory controller 84 reads the transmission data HF2 using, as the read address, the digest value DIm generated from the first determinate unique code UCm by the digest generating unit 82 of the semiconductor device 80.

The write information generating unit 91 has a digest generating unit 92, a dummy value generating circuit 93, a selector 94, and a buffer 95.

The digest generating unit 92 generates the digest value DIw uniquely from the second determinate unique code UCw by the same algorithm as that of the digest generating unit 82. When the semiconductor device 80 is a legitimate product, the second determinate unique code UCw which is supplied to the digest generating unit 92 is the same as the first determinate unique code UCm which is supplied to the digest generating unit 92. That is, the digest value DIw generated by the digest generating unit 92 is the same as the digest value DIm generated by the digest generating unit 82 of the semiconductor device 80.

The dummy value generating circuit 93 generates the dummy value Dd which is written in the memory region 83 of the semiconductor device 80 together with the transmission data HF2. The dummy value Dd is fake encrypted information obtained by encrypting a value different from the hash function HF1.

The selector 94 is a circuit selecting information to be written in the buffer 95. The buffer 95 is a storage which temporarily stores the dummy value Dd and the transmission data HF2. The buffer 95 is, for example, a nonvolatile memory such as a DRAM (Dynamic Random Access Memory). The buffer 95 is preferably a storage having the same capacity as that of the memory region 83 of the semiconductor device 80.

More concretely, at the time of writing the transmission data HF2 to the buffer 95, the selector 94 writes information to the buffer 95 by the same algorithm as that when the memory controller 84 of the semiconductor device 80 performs reading operation using the digest value DIw. For example, in the writing device 90, the selector 94 writes the transmission data HF2 in a region of the address indicated by the digest value DIw in the region of the buffer 95 and writes the dummy value Dd to a region indicated by another address in the buffer 95. The writing device 90 issues an instruction to be sent to the semiconductor device 80 by merging the information stored in the buffer 95.

Figure 10:
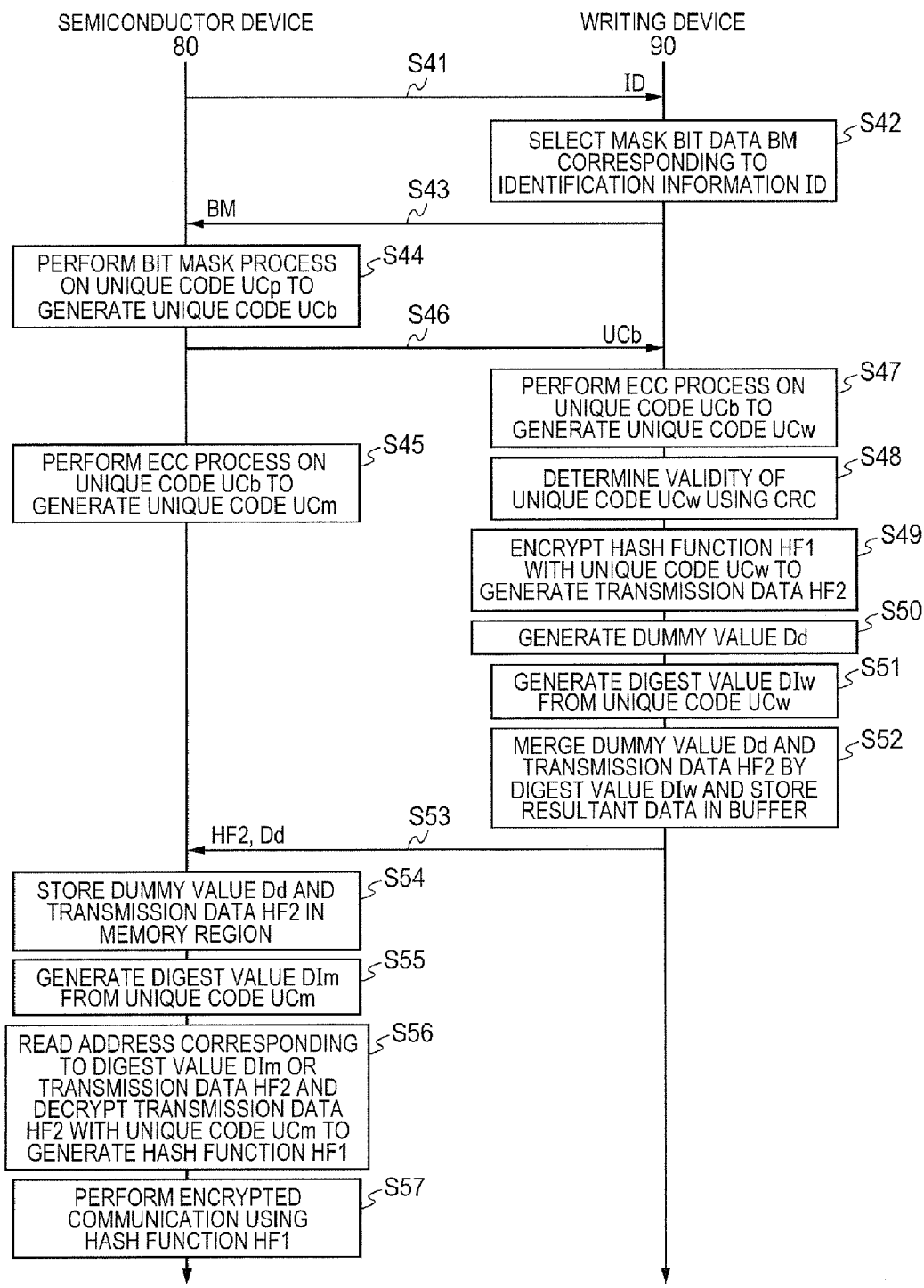
FIG. 10 is a sequence diagram showing the operation of the semiconductor device according to the sixth embodiment and the external device.

The operation of the semiconductor device 80 according to the sixth embodiment and the writing device 90 will now be described. FIG. 10 is a sequence diagram showing the operation of the semiconductor device 80 according to the sixth embodiment and the writing device 90.

As illustrated in FIG. 10, in the data writing system 6 according to the sixth embodiment, first, the writing device 90 obtains the identification information ID from the semiconductor device 80 (step S41). The writing device 90 selects the bit mask data BM corresponding to the received identification information ID from the data in the storing unit 21 (step S42). Subsequently, the writing device 90 transmits the selected bit mask data BM to the semiconductor device 80 (step S43).

The semiconductor device 80 performs the bit mask process on the initial unique code UCp with the bit mask data BM received from the writing device 90 to generate the intermediate unique code UCb (step S44). After that, the semiconductor device 80 transmits the intermediate unique code UCb to the ECC circuit 15 and the writing device 90 (step S46).

In the semiconductor device 80, the ECC circuit 15 applies an ECC code stored in the storing unit 14 to the intermediate unique code UCb and performs the process of correcting an error in the intermediate unique code UCb. The ECC circuit 15 generates the first determinate unique code UCm (step S45).

On the other hand, in the writing device 90, the ECC circuit 23 applies an ECC code stored in the storing unit 22 to the intermediate unique code UCb and performs the process of correcting an error in the intermediate unique code UCb. The ECC circuit 23 generates the second determinate unique code UCw (step S47). Subsequently, the writing device 90 verifies validity of the second determinate unique code UCw by using the CRC code stored in the storing unit 22 (step S48). In the case where it is determined in step S48 that the second determinate unique code UCw is valid, the writing device 90 encrypts the hash function HF1 with the second determinate unique code UCw to generate the transmission data HF2 (step S49).

Subsequently, the writing device 90 generates the dummy value Dd in the dummy value generating circuit 93 (step S50). The writing device 90 also generates the digest value DIw from the second determinate unique code UCw in the digest generating unit 92 (step S51). The writing device 90 merges the dummy value Dd and the transmission data HF2 and stores the merged data in the buffer 95 (step S52). After that, the writing device 90 transmits the dummy value Dd and the transmission data HF2 to the semiconductor device 80 (step S53).

Subsequently, the semiconductor device 80 stores the dummy value Dd and the transmission data HF2 generated by the writing device 90 into the memory region 83 (step S54). After that, the semiconductor device 80 generates the digest value DIm by using the first determinate unique code UCm in the digest generating unit 82 (step S55). The semiconductor device 80 reads the transmission data HF2 from a region indicated by an address corresponding to the digest value DIm in the memory region 83, and encrypts the transmission data HF2 with the first determinate unique code UCm generated in step S45 to generate the hash function HF1 (step S56). The semiconductor device 80 starts encrypted communication with another semiconductor device using the hash function HF1 (step S57).

In the semiconductor device 80 according to the sixth embodiment, the encrypted transmission data HF2 is stored in a region related to a region associated with the unique code correspondence information (for example, the digest value DIm) generated from the first determinate unique code UCm. As a result, in the semiconductor device 80, the transmission data HF2 is stored in the region which varies among devices, so that the region itself which stores the transmission data HF2 can be concealed from an attacker. Therefore, the security on the transmission data HF2 stored in the semiconductor device 80 according to the sixth embodiment can be improved. In the semiconductor device 80 according to the sixth embodiment, the security can be improved without using the secure microcomputer.

In the semiconductor device 80 according to the sixth embodiment, the transmission data HF2 is stored in a memory region as a region which can be accessed by a CPU (Central Processing Unit) or the like. However, the transmission data HF2 stored is information encrypted with the second determinate unique code UCw having the same value as that of the first determinate unique code UCm. In the semiconductor device 80 according to the sixth embodiment, the hash function HF1 is generated as necessary. Consequently, at the time of maintenance or the like, a maintenance person having an encryption key corresponding to the hash function HF1 as the original information of the transmission data HF2 can analyze failure in the hash function HF1. On the other hand, even in the case where an attacker can read the transmission data HF2, the attacker cannot understand the algorism by which the transmission data HF2 is encrypted, so that the attacker cannot decrypt the hash function HF1 from the transmission data HF2. That is, in the semiconductor device 80 according to the sixth embodiment, the security can be improved without sacrificing the maintenance performance on the hash function HF1 as confidential information.

In the data writing system 6 according to the sixth embodiment, by encrypting the hash function HF1 with the unique code UCw of the system itself, the transmission data HF2 is generated. Consequently, at the time of decrypting the transmission data HF2, it is sufficient for the semiconductor device 80 according to the sixth embodiment to use only the first determinate unique code UCm of itself, and it is unnecessary to obtain an encryption key used for decryption by coupling to a database of a server or the like. That is, the semiconductor device 80 according to the sixth embodiment does not need a security measure on coupling to a server or the like.

Further, in the semiconductor device 80 according to the sixth embodiment, it is unnecessary to assure more than the capacity of the buffer 95 of the writing device 90 as the capacity of the memory region storing the transmission data HF2. Consequently, the memory region in the semiconductor device 80 according to the sixth embodiment can be used effectively.

In the sixth embodiment, writing is performed from the writing device 90 to the semiconductor device 80 in a state where the dummy data Dd and the transmission data HF2 are merged. In such a manner, even in the case where an attack such as a side channel attack is made on the communication path from the writing device 90 to the semiconductor device 80, the attacker cannot distinguish between the dummy value Dd and the transmission data HF2. When information of the hash function HF1 is transmitted from the writing device 90 to the semiconductor device 80, the transmission data HF2 obtained by encrypting the hash function HF1 is transmitted. Consequently, even when the attacker can determine the transmission data HF2, as long as the encryption algorithm is unknown, the hash function HF1 is not obtained by the attacker. Also from such a viewpoint, the semiconductor device 80 and the writing device 90 according to the sixth embodiment can improve the security on the hash function HF1 as confidential information.

Seventh Embodiment

Figure 11:
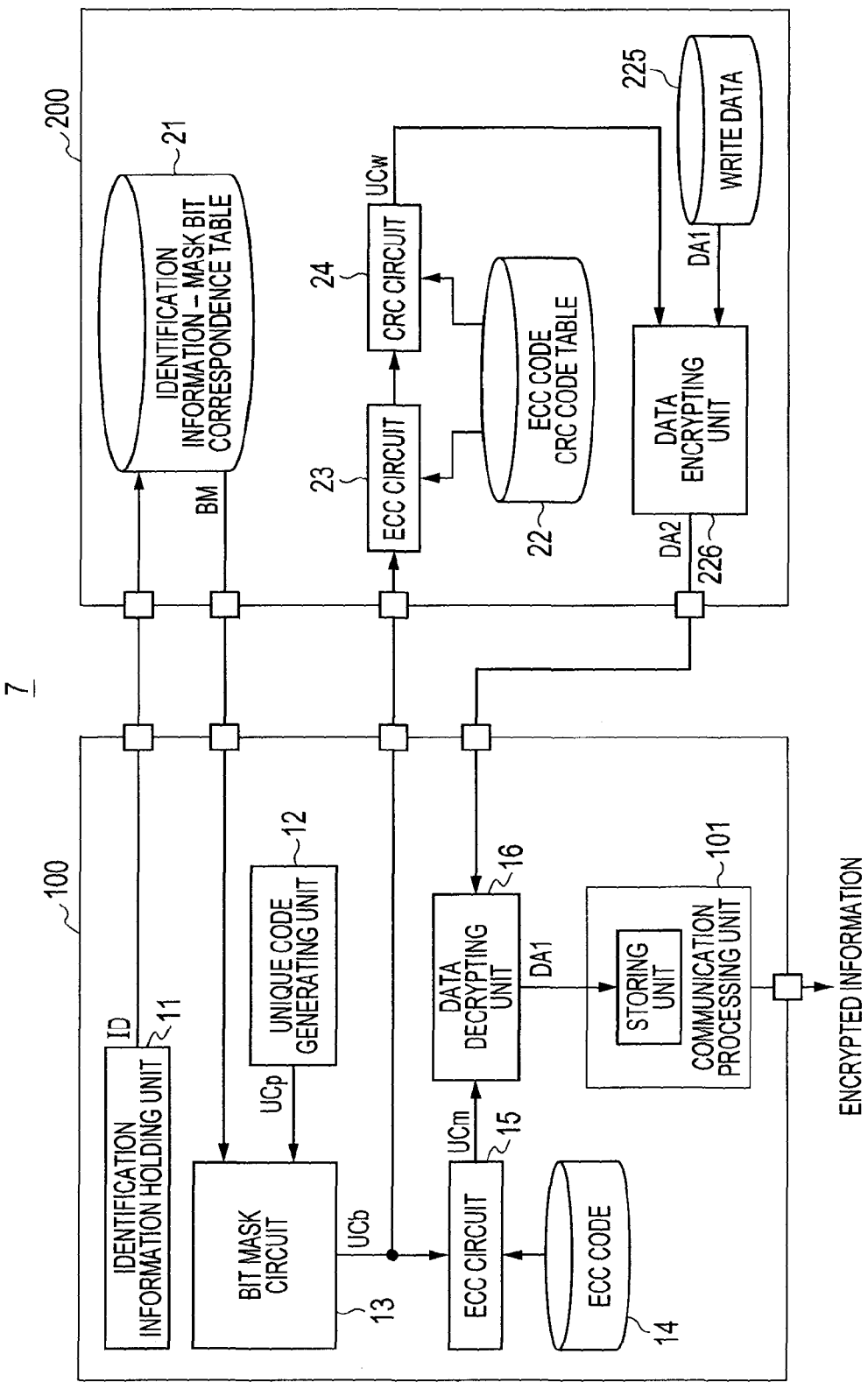
FIG. 11 is a block diagram of a semiconductor device according to a seventh embodiment and an external device.

FIG. 11 is a block diagram of a semiconductor device 100 according to a seventh embodiment and an external device (for example, a writing device 200). As shown in FIG. 11, a data writing system 7 according to the seventh embodiment is configured by the semiconductor device 100 and the writing device 200.

The semiconductor device 100 is obtained by changing the encrypting unit 17 of the semiconductor device 1 according to the first embodiment to a communication processing unit 101. Since a decrypting unit in the semiconductor device 100 decrypts write data, the decrypting unit is shown as a data decrypting unit 16. The communication processing unit 101 has a storing unit. In the storing unit, write data DA1 obtained by performing decrypting process on reception data by the data decrypting unit 16 is stored. The communication processing unit 101 is a circuit which operates using write data stored in the storing unit. The writing device 200 has the write data DA1 in place of the hash function HF1 as confidential information to be written. In FIG. 11, a storing unit 225 storing the write data DA1 is shown. In FIG. 11, a data encrypting unit 226 is shown as a circuit encrypting the write data DA1 with the second determinate unique code UCw to generate transmission data DA2. Since the operation of the data encrypting unit 226 is substantially the same as that of the hash function encrypting unit 26 in the first embodiment, it will not be described.

Figure 12:
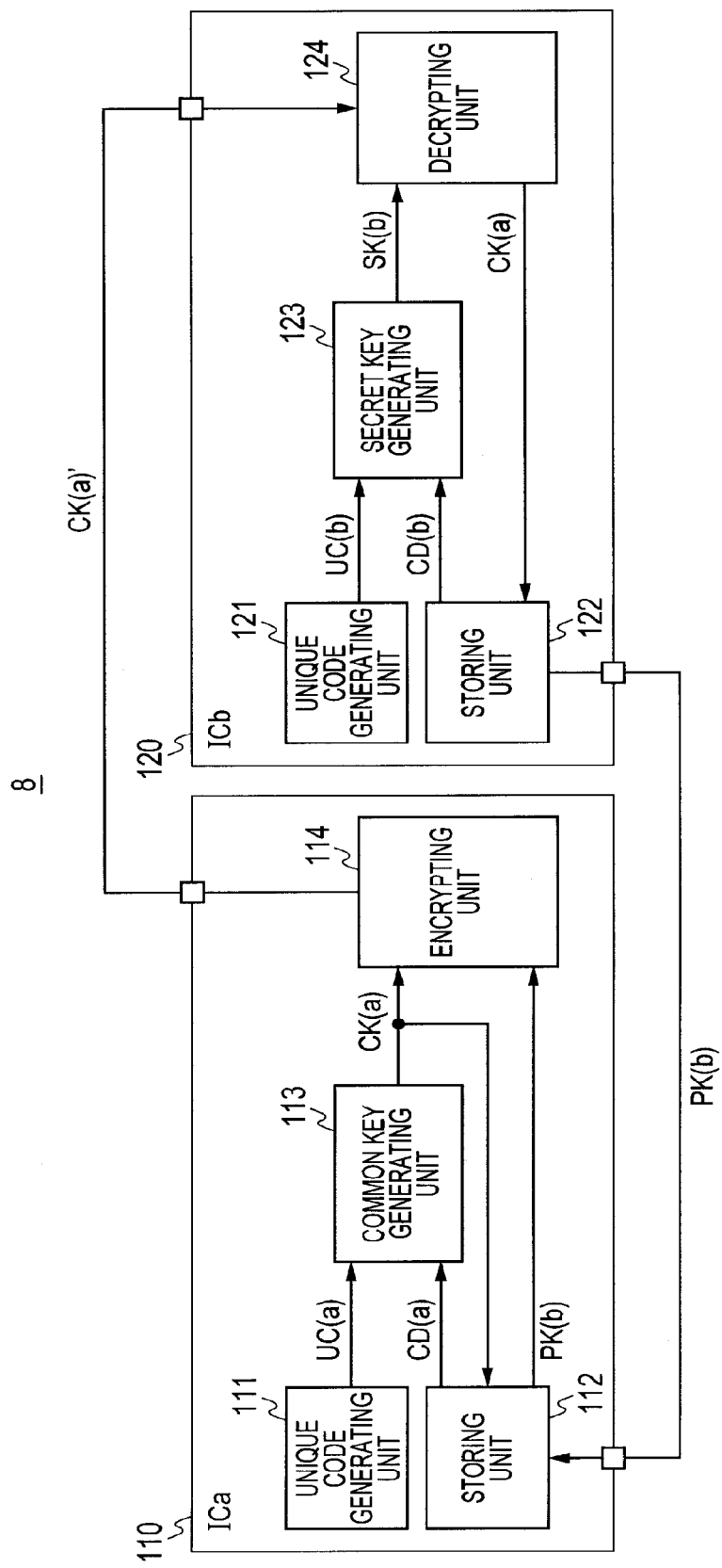
FIG. 12 is a block diagram of an example of the semiconductor device according to the seventh embodiment and an encryption communication system using the semiconductor device in which confidential information is written by using the external device.

In the seventh embodiment, a method of using information written in the semiconductor device will be described. More concretely, an example of the communication processing unit 101 (or the semiconductor device) which operates using the stored write data DA1 will be described. FIG. 12 shows an example of an encryption communication system 8 configured by a semiconductor device in which the write data DA1 is written by the data writing system 7 shown in FIG. 7. In the example shown in FIG. 12, it is assumed that write data received as confidential information includes unique correction data which is a value unique to a device and is used for correcting an error in a unique code including an error in a random bit, and arithmetic expression information for generating an encryption key from the initial unique code subjected to the error correction. The configuration of the circuit block of the semiconductor device shown in FIG. 12 corresponds to an example of the configuration of the communication processing unit 101.

As shown in FIG. 12, the encryption communication system 8 according to the seventh embodiment has a semiconductor device ICa (110) and a semiconductor device ICb (120). The semiconductor device 110 has a unique code generating unit 111, a storing unit 112, a common key generating unit 113, and an encrypting unit 114.

The unique code generating unit 111 generates a unique code UC(a) unique to the semiconductor device 110 and outputs it to the common key generating unit 113. The unique code UC(a) generated by the unique code generating unit 111 has the same nature as that of the initial unique code generated by the unique code generating unit 12 in the semiconductor device 1. Consequently, the unique code generating unit 12 may be used in place of the unique code generating unit 111.

The storing unit 112 can store correction data CD(a), a common key CK(a) generated by the common key generating unit 113, and a public key PK(b) of the semiconductor device 120. The correction data CD(a) corresponds to write data written in the semiconductor device ICa. The storing unit 112 has, for example, a volatile memory and a nonvolatile memory. The correction data CD(a) and the public key PK(b) are stored in the nonvolatile memory, and the common key CK(a) is stored in the volatile memory. Therefore, the storing unit 112 temporarily stores the common key CK(a) and, when the power supply of the semiconductor device 110 is turned off, the information of the common key CK(a) is lost.

The common key generating unit 113 generates the common key CK(a) by using the unique code UC(a) output from the unique code generating unit 111 and the correction data CD(a) stored in the storing unit 112.

The unique code UC(a) generated by the unique code generating unit 111 is data including the value of a bit which fluctuates due to an external factor at the time of generating the unique code, such as temperature, voltage, or the like. Consequently, the unique code UC(a) generated by the unique code generating unit 111 includes three bits of (1) a bit having a stable value, (2) a bit which fluctuates at high probability (that is, a bit having relatively large fluctuation in the value), and (3) a bit which fluctuates at low probability (that is, a bit having relatively small fluctuation in the value). In such a manner, the unique code UC(a) generated by the unique code generating unit 111 includes (2) a bit which fluctuates at high probability and (3) a bit which fluctuates at low probability. Therefore, the unique code UC(a) has a value which is different each time it is generated.

A bit which fluctuates at high probability can be grasped in the manufacture process. By determining each of the bits in the manufacture process, mask data for masking a bit which fluctuates at high probability can be generated. By masking the unique code UC(a) generated by the unique code generating unit 111 with the mask data, the bit which fluctuates at high probability included in the unique code UC(a) can be eliminated. Since the position of a bit which fluctuates at high probability varies among semiconductor devices, the mask data is data unique to the semiconductor device.

Since a bit which fluctuates at low probability fluctuates due to an external factor, remaining charge, and the like, it is difficult to predict the bit. Consequently, for a bit which fluctuates at low probability, an ECC code represented by, for example, a BCH code, a Reed-Solomon code, or the like is generated at the time of manufacture, and an error is corrected with the ECC code. Hereinafter, the operation of the common key generating unit 113 will be described concretely.

Figure 14:
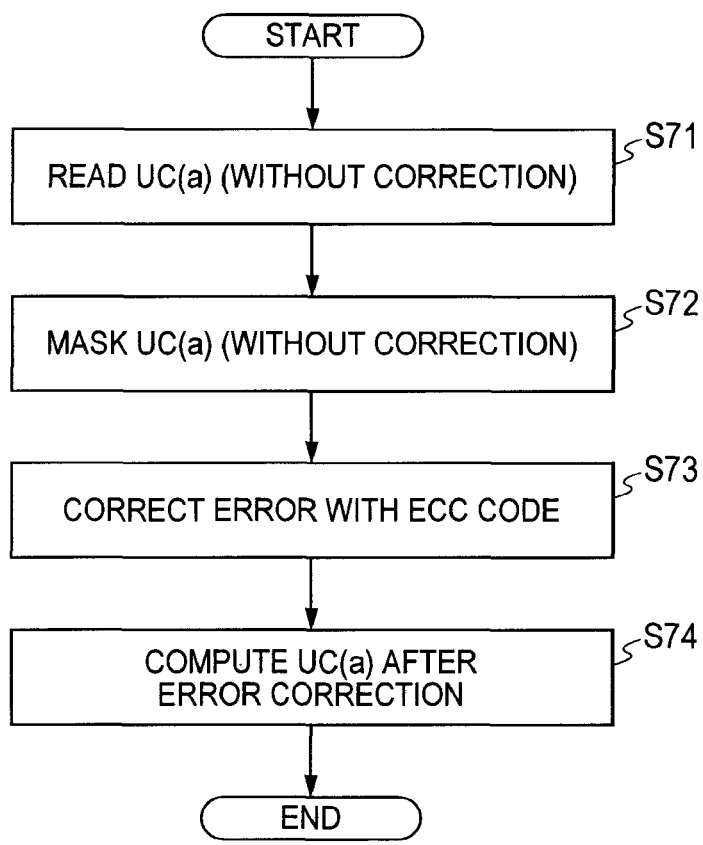
FIG. 14 is a flowchart for explaining the operation of a common key generating unit in the encryption communication system shown in FIG. 12.

FIG. 14 is a flowchart for explaining the operation of the common key generating unit 113, and FIG. 15 is a table showing an example of unique codes processed by the common key generating unit 113. First, the common key generating unit 113 reads the unique code UC(a) from the unique code generating unit 111 (step S71). The unique code UC(a) read at this time is a unique code which is not subjected to error correction.

Subsequently, the common key generating unit 113 masks the read unique code UC(a) with mask data included in the correction data CD(a) (step S72). The mask data is data for masking a bit having high error rate in bits of the unique code UC(a). In the example shown in FIG. 15, since the first and sixth bits in the unique code UC(a) have high error rate, the mask data is "0". Since the other bits have low error rate or stable values, the mask data is "1". That is, the mask data for the bit necessary to be masked is "0", and the mask data for the bit which does not have to be masked is "1". By masking the unique code UC(a) with the mask data, data subjected to the mask process of eliminating the first and sixth bits in the unique code UC(a) can be obtained (the bits eliminated by the mask process are indicated by "X"). After that, the unique code UC(a) subjected to the mask process is aligned to the left.

Using the ECC code (Error Checking and Correction code) included in the correction data CD (a), an error in the unique code UC(a) subjected to the mask process is corrected (step S73). In the example shown in FIG. 15, the first bit is corrected from "0" to "1" by the error correction using the ECC code.

Next, using an operation parameter included in the correction data CD(a), predetermined operation is performed on the unique code UC(a) subjected to the error correction (step S74). In the example shown in FIG. 15, NOT operation is performed on the error-corrected unique code UC(a). The unique code UC(a) subjected to the operation becomes the common key CK(a). The NOT operation is an example. The operation performed on the error-corrected unique code UC(a) may be any operation. By changing the operation parameter, the common key CK(a) can be changed as necessary. By performing predetermined operation on the error-corrected unique code UC(a) with the operation parameter, the common key CK(a) can be made a code which is not apparently similar to the unique code UC(a). Therefore, the security level can be further improved. The operation performed on the error-corrected unique code UC(a) can be omitted. In this case, the unique code UC(a) subjected to the error correction with the mask data and the ECC code becomes the common key CK(a). The common key CK(a) generated in such a manner is output to the storing unit 112 and the encrypting unit 114.

The mask data, the ECC code, and the operation parameter included in the correction data CD(a) are preliminarily generated as data unique to the semiconductor device 110 and stored in the storing unit 112.

As described above, the common key generating unit 113 has not only the function of generating the common key CK(a) but also the function of correcting the unique code UC(a) with the correction data CD(a). Similarly, a secret key generating unit 123 shown in FIG. 12 functions as a unique code correcting unit correcting the unique code UC with the correction data CD. Although generating units are expressed as, for convenience, a common key generating unit, a secret key generating unit, and a public key generating unit for keys generated in the specification, the configuration and operation of the generating units are basically similar to each other.

The encrypting unit 114 in FIG. 12 encrypts the common key CK(a) generated by the common key generating unit 113 with the public key PK(b) of the semiconductor device 120. The public key PK(b) used for the encryption may be preliminarily transmitted from the semiconductor device 120 to the semiconductor device 110 and stored in the storing unit 112. The public key PK(b) used for the encryption may be directly supplied from the semiconductor device 120 to the encrypting unit 114 at the time of encrypting the common key CK(a) in the encrypting unit 114.

The semiconductor device 120 has a unique code generating unit 121, a storing unit 122, the secret key generating unit 123, and an encrypting unit 124. The unique code generating unit 121 generates the unique code UC(b) which is unique to the semiconductor device 120 and outputs it to the secret key generating unit 123. The configuration and operation of the unique code generating unit 121 are basically similar to those of the unique code generating unit 111.

The storing unit 122 can store the correction data CD(b), the public key PK(b), and the common key CK(a) which is decrypted by the decrypting unit. The correction data CD(b) corresponds to write data to be written by the data writing system 7 according to the seventh embodiment. The storing unit 122 has, for example, a volatile memory and a nonvolatile memory. The correction data CD(b) and the public key PK(b) are stored in the nonvolatile memory, and the common key CK(a) is stored in the volatile memory. Therefore, the storing unit 122 temporarily stores the common key CK(a) and, when the power supply of the semiconductor device 120 is turned off, the information of the common key CK(a) is lost.

The secret key generating unit 123 generates the secret key SK(b) of the semiconductor device 120 by using the unique code UC(b) and the correction data CD(b). The method of generating the secret key SK(b) in the secret key generating unit 123 is basically similar to a method of generating the common key CK(a) in the common key generating unit 113.

The decrypting unit 124 decrypts a common key CK(a)' encrypted by the encrypting unit 114 of the semiconductor device 110 with the secret key SK(b) to generate the common key CK(a).

Figure 13:
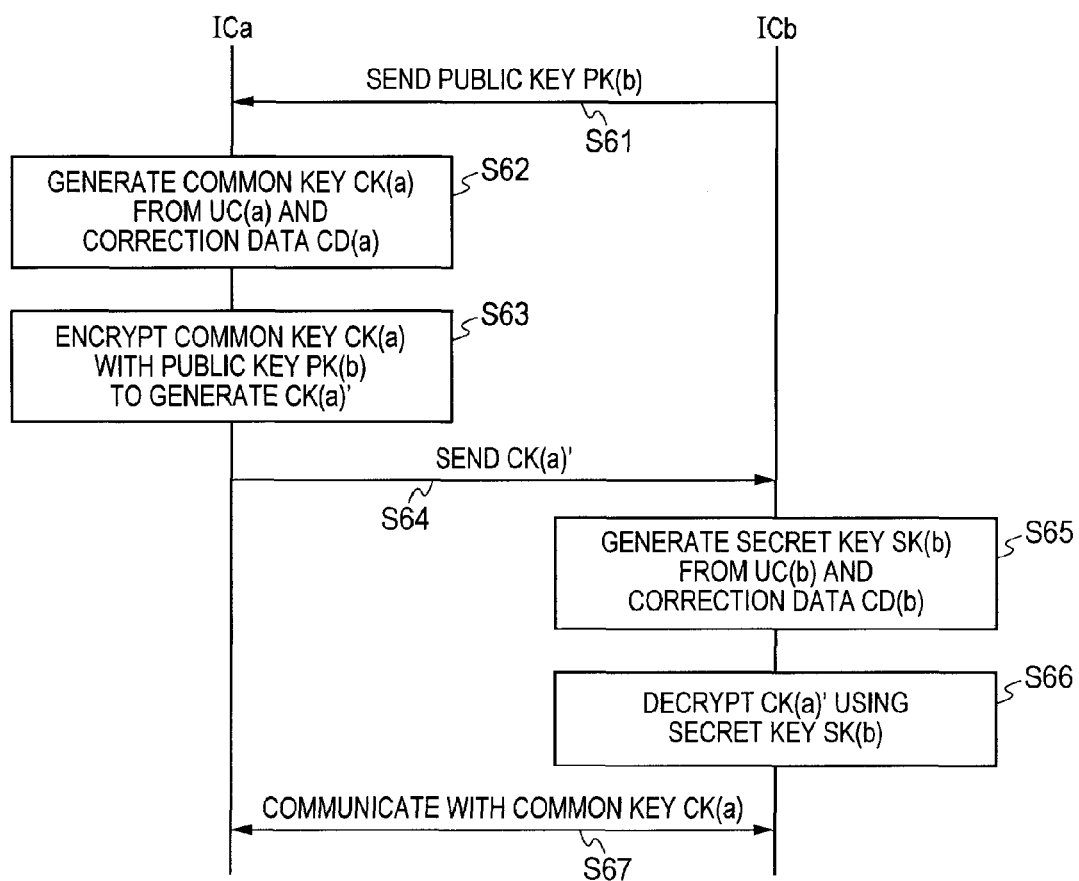
FIG. 13 is a flowchart for explaining the operation of the encryption communication system shown in FIG. 12.

Next, the operation of the encrypted communication system according to the embodiment will be described with reference to the flowchart shown in FIG. 13. First, the semiconductor device ICb (120) transmits the public key PK(b) of the semiconductor device ICb (120) to the semiconductor device ICa (110) (step S61). The transmitted public key PK(b) is stored in the storing unit 112 of the semiconductor device 110.

The common key generating unit 113 of the semiconductor device 110 generates the common key CK (a) using the unique code UC(a) output from the unique code generating unit 111 and the correction data CD(a) stored in the storing unit 112 (step S62). The encrypting unit 114 encrypts the common key CK(a) generated by the common key generating unit 113 using the public key PK (b) of the semiconductor device 120 to generate an encrypted common key CK(a)' (step S63). After that, the encrypted common key CK(a) is transmitted from the semiconductor device 110 to the semiconductor device 120 (step S64).

The secret key generating unit 123 of the semiconductor device 120 generates a secret key SK(b) of the semiconductor device 120 using the unique code UC(b) and the correction data CD(b) (step S65). The decrypting unit 124 decrypts the encrypted common key CK(a)' with the secret key SK(b) to generate the common key CK(a) (step S66). By the process, both the semiconductor devices 110 and 120 can hold the common key CK(a). Therefore, the semiconductor devices 110 and 120 can perform encrypted communication using the common key CK(a) (step S67). The order of the steps can be properly changed unless there is no contradiction. For example, in parallel with execution of steps S62 and S63 by the semiconductor device 110, the semiconductor device 120 may execute step S65.

In related art, in the case of executing encrypted communication using the common key CK(x) between the semiconductor devices ICx and ICy, the semiconductor devices ICx and ICy have to share the common key CK(x). When the semiconductor device ICx has the common key CK(x), the semiconductor device ICx encrypts the common key CK(x) with the public key PK(y) which is preliminarily obtained and transmits it to the semiconductor device ICy. The semiconductor device ICy decrypts the encrypted common key CK(x)' with the secret key SK(y) of the semiconductor device ICy to obtain the common key CK(x). By transmitting the common key CK(x) from the semiconductor device ICx to the semiconductor device ICy by the public key encrypting method, the semiconductor devices ICx and ICy can share the common key CK(x) without awareness of a third party. In such a manner, the semiconductor devices ICx and ICy can perform encrypted communication using the common key encrypting method.

At the time of transmitting the common key CK(x) from ICx to ICy, since the common key CK(x) is encrypted, information of the common key CK(x) is not leaked. However, in the nonvolatile memories (storing units) of the semiconductor devices (semiconductor chips) ICx and IC, important data such as the common key CK(x) and the secret key SK(y) is stored. There is consequently a problem such that, when the semiconductor device is illegally analyzed, the important data such as the common key CK(x) and the secret key SK(y) is leaked.

In contrast, in the encryption communication system according to the embodiment, the common key generating unit 113 of the semiconductor device 110 generates the common key CK(a) by using the unique code UC(a) which is unique to the semiconductor device 110 and the correction data CD(a). The secret key generating unit 123 of the semiconductor device 120 generates the secret key SK(b) of the semiconductor device 120 by using the unique code UC(b) which is unique to the semiconductor device 120 and the correction data CD(b). Therefore, since the important data such as the common key CK(a) and the secret key SK(b) is not directly stored in the storing units 112 and 122, even if the semiconductor device is illegally analyzed, the important data such as the common key CK(a) and the secret key SK(b) is not leaked.

In the encryption communication system 8 according to the seventh embodiment, since the important data such as the common key CK(a) and the secret key SK(b) is not directly stored in the storing units 112 and 122, even if the semiconductor device is illegally analyzed, the important data such as the common key CK(a) and the secret key SK(b) is not leaked. Consequently, even when the semiconductor devices 110 and 120 are configured by a general microcomputer whose security level is relatively low, high security level can be realized.

Although the correction data CD(a) and CD(b) used for generating the common key CK(a) and the secret key SK(b) has security level lower than that of the common key CK(a) and the secret key SK(b), the correction data CD(a) and CD(b) has relatively high security level. Therefore, to prevent the correction data CD(a) and CD(b) from being leaked to a third party, secure microcomputers may be used for the semiconductor devices 110 and 120 in which the correction data CD(a) and CD(b) is stored.

In the encryption communication system 8 according to the seventh embodiment, although the correction data CD(a) and CD(b) is very important data to generate key information. By using the data writing system 7 according to the seventh embodiment, the important data can be written in the semiconductor device while maintaining high security.

Eighth Embodiment

Figure 16:
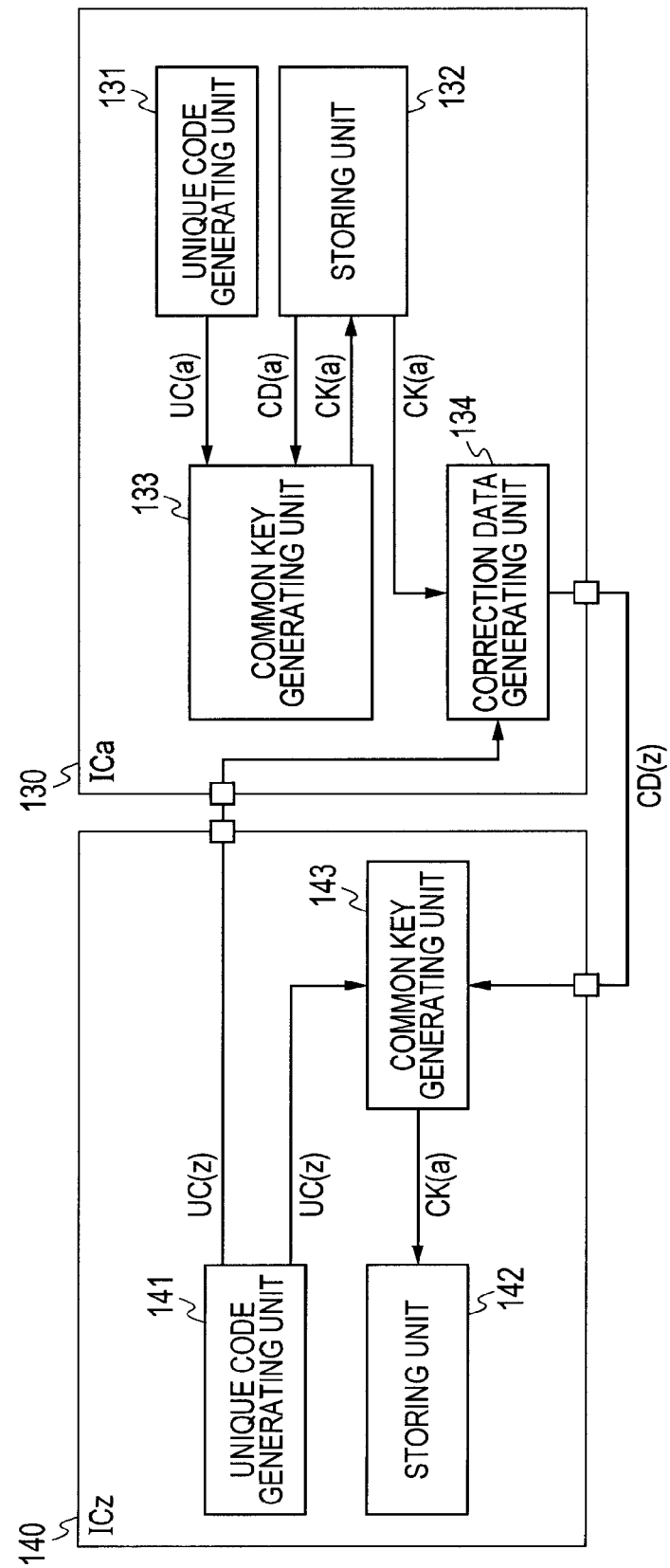
FIG. 16 is a block diagram showing another example of the semiconductor device according to the seventh embodiment and the encryption communication system using the semiconductor device in which confidential information is written by using the external device.

In an eighth embodiment, another example of using a semiconductor device in which write data is written by the data writing system 7 according to the seventh embodiment will be described. FIG. 16 is a block diagram of an encryption communication system 9 according to the eighth embodiment. The circuit block of the semiconductor device shown in FIG. 16 corresponds to circuits in the communication processing unit 101 shown in FIG. 11.

The encryption communication system 9 according to the eighth embodiment has a semiconductor device ICa (130) (first semiconductor device) and a semiconductor device ICz (140) (second semiconductor device). The semiconductor device ICa (130) and another semiconductor device (not shown) form a secure network. In the embodiment, the case of newly adding the semiconductor device ICz (140) to the secure network including the semiconductor device ICa (130) will be described.

The semiconductor device 130 has a unique code generating unit 131, a storing unit 132, a common key generating unit (first common key generating unit) 133, and a correction data generating unit 134.

The unique code generating unit 131 generates the unique code UC(a) (first unique code) which is unique to the semiconductor device 130 and outputs it to the common key generating unit 133. The unique code UC(a) generated by the unique code generating unit 131 has the same nature as that of the initial unique code generated by the unique code generating unit 12 of the semiconductor device 1. Consequently, in place of the unique code generating unit 131, the unique code generating unit 12 can be used.

The storing unit 132 can store the correction data CD(a) (first correction data) and the common key CK(a) (first common key) generated by the common key generating unit 133. The storing unit 132 has, for example, a volatile memory and a nonvolatile memory. The correction data CD(a) is stored in the nonvolatile memory, and the common key CK(a) is stored in the volatile memory. Therefore, the storing unit 132 temporarily stores the common key CK(a) and, when the power supply of the semiconductor device 130 is turned off, the information of the common key CK(a) is erased.

The common key generating unit 133 generates the common key CK(a) by using the unique code UC(a) output from the unique code generating unit 131 and the correction data CD(a) stored in the storing unit 132.

The unique code UC(a) generated by the unique code generating unit 131 has the same nature as the unique code UC(a) generated by the unique code generating unit 111 of the seventh embodiment. Consequently, like in the seventh embodiment, at the time of generating key information, an error has to be corrected by the mask data and the ECC code.

Since the operation of the common key generating unit 133 is substantially the same as that of the common key generating unit 113 of the seventh embodiment, the description will not be repeated here. The mask data, the ECC code, and the operation parameter included in the correction data CD(a) are preliminarily generated as data unique to the semiconductor device 130 and stored in the storing unit 132. A method of generating the correction data CD(a) is similar to that in the case where the correction data generating unit 134 which will be described later generates the correction data CD(z).

Figure 18:
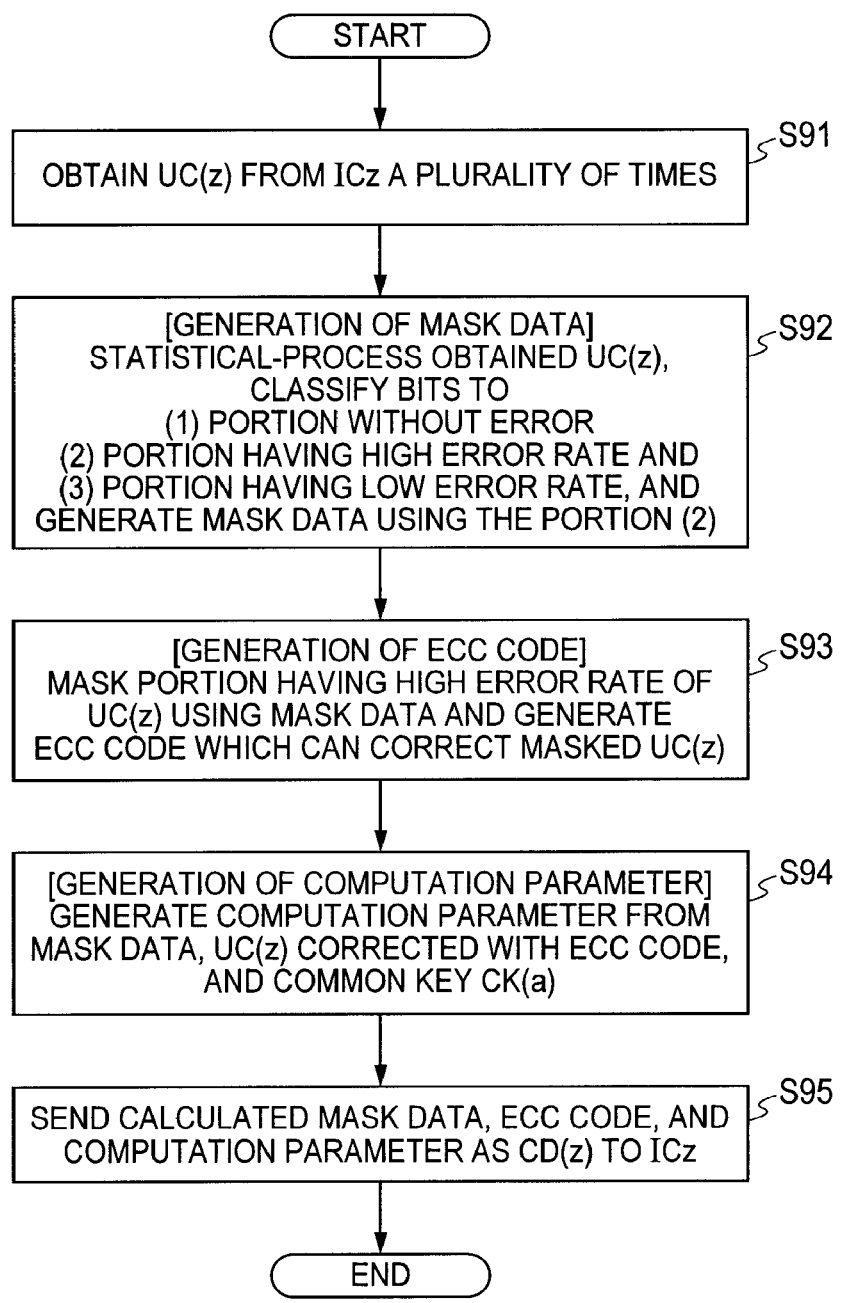
FIG. 18 is a flowchart for explaining the operation of a correction data generating unit in the encryption communication system shown in FIG. 16.

The correction data generating unit 134 generates the correction data CD(z) (second correction data) by using the unique code UC(z) (second unique code) of the semiconductor device 140 and the common key CK(a). The operation performed in the case where the correction data generating unit 134 generates correction data will be described in detail with reference to FIG. 18.

First, the unique code UC(z) is obtained a plurality of times from the semiconductor device ICz (140) (step S91). The unique code UC(z) obtained in step S91 is statistically processed and bits of the unique code UC(z) are classified to three bits of (1) a bit having a stable value, (2) a bit which fluctuates at high probability (that is, a bit having relatively large fluctuation in the value), and (3) a bit which fluctuates at low probability (that is, a bit having relatively small fluctuation in the value). Mask data is generated using (2) a bit which fluctuates at high probability (step S92). For example, information indicating the position of a bit which fluctuates at probability higher than predetermined threshold in the bits of the unique code UC(z) is used as mask data.

The unique code UC(z) is masked with the mask data generated in step S92, and a bit which fluctuates at high probability is eliminated. An ECC code by which an error in the masked unique code UC(z) (that is, the unique code including a bit whose value is stable and a bit which fluctuates at low probability) can be corrected is generated (step S93). The ECC code is, for example, a BCH code or a Reed-Solomon code.

Next, using the mask data generated in step S92, the unique code UC(z) which is subjected to the error correction using the ECC code generated in step S93 (that is, the unique code including a bit whose value is table), and the common key CK(a) stored in the storing unit 132, an operation parameter is generated (step S94). The operation parameter is necessary to generate the common key CK(a) from the corrected unique code UC(z). The mask data, the ECC code, and the operation parameter generated by the process are transmitted as correction data CD(z) to the semiconductor device ICz (140) (step S95).

Figure 19:
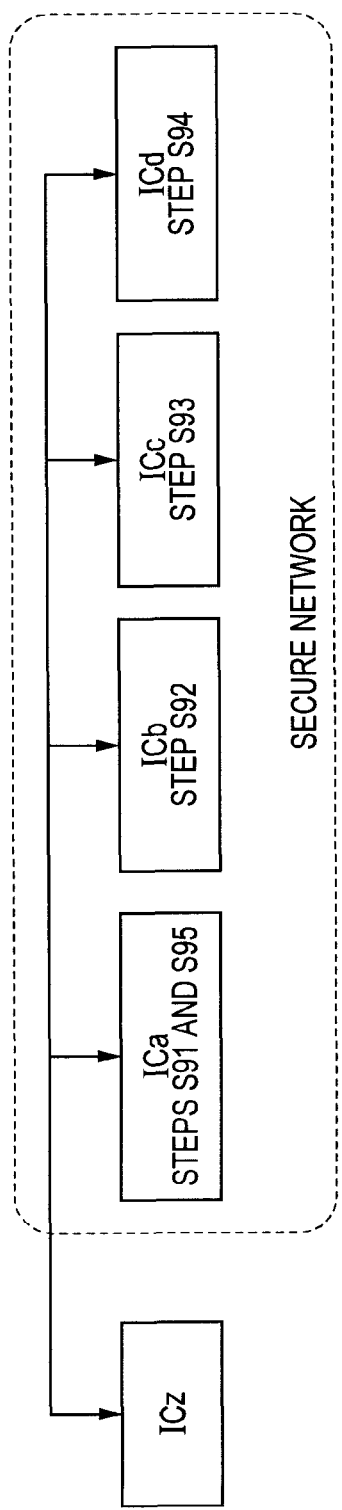
FIG. 19 is a diagram showing the case of generating correction data by using a plurality of semiconductor devices.

Processes (steps S91 to S95) for generating the correction data CD(z) may be performed dispersedly by using a plurality of semiconductor devices. FIG. 19 is a diagram showing the case of generating the correction data CD(z) by using a plurality of semiconductor devices ICa, ICb, ICc, and ICd. The semiconductor devices ICa, ICb, ICc, and ICd make up a secure network.

In an example shown in FIG. 19, the semiconductor device ICa performs steps S91 and S95. That is, the semiconductor device ICa functions as a window to the semiconductor device ICz. The semiconductor device ICb performs step S92 (generation of mask data). The semiconductor device ICc performs step S93 (generation of the ECC code). The semiconductor device ICd performs step S94 (generation of the operation parameter). The configuration of FIG. 19 is an example and the semiconductor devices may be arbitrarily assigned to the steps. By making the processes (steps S91 to S95) for generating the correction data CD(z) dispersed to a plurality of semiconductor devices, the security level of the encryption communication system can be improved, and the load can be prevented from being concentrated on one semiconductor device.

The semiconductor device 140 shown in FIG. 16 has a unique code generating unit 141, a storing unit 142, and a common key generating unit (second common key generating unit) 143. The unique code generating unit 141 generates the unique code UC(z) unique to the semiconductor device 140 and outputs it to the correction data generating unit 134 and the common key generating unit 143. The configuration and operation of the unique code generating unit 141 are basically the same as those of the unique code generating unit 131.

The storing unit 142 can store the common key CK(a) generated by the common key generating unit 143. The storing unit 142 stores the common key CK(a) in the nonvolatile memory. Therefore, the storing unit 142 temporarily stores the common key CK(a) and, when the power supply of the semiconductor device 140 is turned off, the information of the common key CK(a) is erased.

The common key generating unit 143 generates the common key CK(a) (first common key) by using the unique code UC(z) output from the unique code generating unit 141 and the correction data CD(z) output from the correction data generating unit 134. The method of generating the common key CK(a) by the common key generating unit 143 is basically similar to the above-described method of generating the common key CK(a) by the common key generating unit 133.

Figure 17:
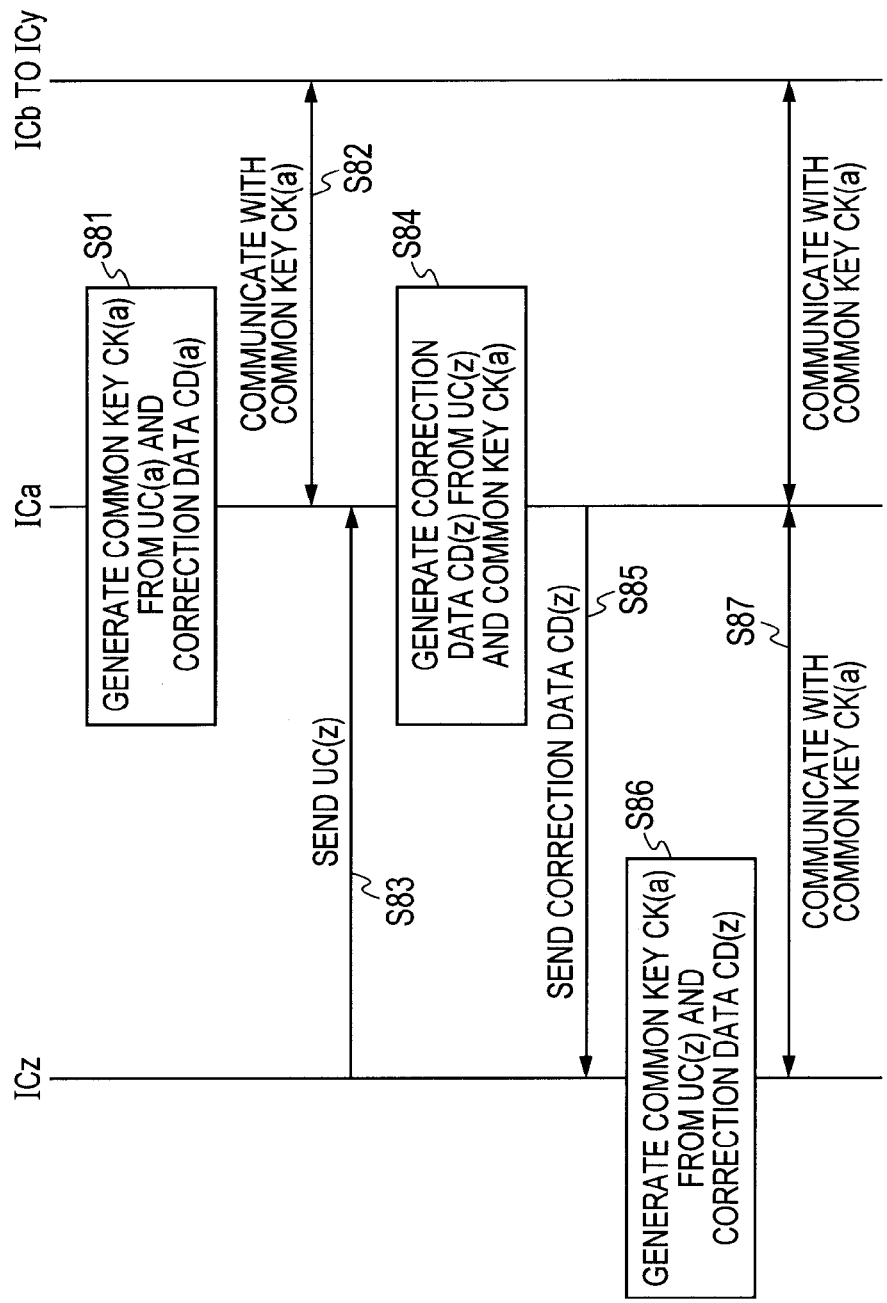
FIG. 17 is a flowchart for explaining the operation of the encryption communication system shown in FIG. 16.

Next, the operation of the encrypted communication system according to the embodiment will be described with reference to the flowchart shown in FIG. 17. First, the common key generating unit 133 of the semiconductor device ICa (130) generates the common key CK(a) by using the unique code UC(a) output from the unique code generating unit 131 and the correction data CD(a) stored in the storing unit 132 (step S81). After that, the semiconductor device ICa (130) starts communication with the other semiconductor devices ICb to ICy (not shown) by using the common key CK(a) (step S82).

The semiconductor device 140 transmits the unique code UC(z) of the semiconductor device 140 to the correction data generating unit 134 of the semiconductor device 130 (step S83). The correction data generating unit 134 of the semiconductor device 130 generates the correction data CD(z) by using the unique code UC(z) of the semiconductor device 140 and the common key CK(a) stored in the storing unit 132 (step S84). To generate the correction data CD(z), the correction data generating unit 134 has to obtain the unique code UC(z) a plurality of times. To obtain the unique code UC(z) a plurality of times, the step S83 is repeated.

The generated correction data CD(z) is transmitted to the common key generating unit 143 of the semiconductor device 140 (step S85). The common key generating unit 143 of the semiconductor device 140 generates the common key CK(a) by using the unique code UC(z) output from the unique code generating unit 141 and the correction data CD(z) output from the correction data generating unit 134 (step S86). By the process, the newly added semiconductor device 140 can hold the common key CK(a). Therefore, the newly added semiconductor device (ICz) 140 can perform encrypted communication with the semiconductor device (ICa) 130 and the other semiconductor devices ICb to ICy by using the common key CK(a) (step S87).

In the case of newly adding the semiconductor device ICz to the encryption communication system in which secure communication is established, whether the semiconductor device ICz to be added is a regular semiconductor device or not has to be verified. However, to verify whether the semiconductor device ICz is a regular semiconductor device or not, for example, an expensive secure server has to be assembled in the encryption communication system. It causes a problem such that the cost of the encryption communication system increases.

In contrast, in the encryption communication system 9 according to the eighth embodiment, the correction data generating unit 134 of the semiconductor device 130 generates the correction data CD(z) by using the unique code UC(z) which is unique to the semiconductor device 140 and the correction data CD(z). The common key generating unit 143 in the semiconductor device 140 generates the common key CK(a) by using the correction data CD(z) and the unique code UC(z) of the semiconductor device 140. Therefore, since it is unnecessary to assemble an expensive secure server in the encryption communication system to verify whether the semiconductor device ICz to be added is a regular semiconductor device or not, a semiconductor device can be easily and inexpensively added to the encryption communication system performing secure communication.

In the encryption communication system 9 according to the eighth embodiment, the common key generating unit 133 of the semiconductor device 130 generates the common key CK(a) by using the unique code UC(a) which is unique to the semiconductor device 130 and the correction data CD(a). The common key generating unit 143 of the semiconductor device 140 generates the common key CK(a) by using the unique code UC(a) which is unique to the semiconductor device 140 and the correction data CD(z). Therefore, since the common key CK(a) as important data is not directly stored in the storing units 132 and 142, even if the semiconductor device is analyzed illegally, the data of the common key CK(a) is not leaked. Therefore, by the encryption communication system according to the embodiment, while realizing improvement in security, a semiconductor device can be easily and inexpensively added to an encryption communication system performing secure communication.

In the encryption communication system 9 according to the eighth embodiment, important data such as the common key CK(a) is not directly stored in the storing units 132 and 142. Even if the semiconductor device is analyzed illegally, the important data such as the common key CK(a) is not leaked. Consequently, even if the semiconductor devices 130 and 140 are configured by general microcomputers having relatively low security level, high security level can be realized.

Although the correction data CD(a) used for generating the common key CK(a) in the semiconductor device 130 has security level lower than that of the common key CK(a), it is information having relatively high security level. In the data writing system 7 according to the seventh embodiment, such information having relatively high security level can be stored in the semiconductor device while maintaining high security.

Since the correction data CD(z) transmitted from the semiconductor device 130 to the semiconductor device 140 is data related to the unique code UC(z) and the common key CK(a), it is information having relatively high security level. Therefore, at the time of transmitting the correction data CD(z) from the semiconductor device 130 to the semiconductor device 140, the correction data CD(z) may be encrypted by using the public key encrypting method and sent. In this case, for example, the semiconductor device 140 holds the secret key of the semiconductor device 140, and the semiconductor device 130 encrypts the correction data CD(z) with the public key of the semiconductor device 140 at the time of transmitting the correction data CD(z). The semiconductor device 140 decrypts the encrypted correction data CD(z) with the secret key. In such a manner, the correction data is encrypted and transmitted from the semiconductor device 130 to the semiconductor device 140.

The present invention is not limited to the foregoing embodiments but can be properly changed without departing from the gist. A person skilled in the art naturally understands such that matters related to the plurality of embodiments are combined to one device and, for example, the changes from the first embodiment to the second embodiment are applied to the third embodiment.

What is claimed is:

1. A semiconductor device comprising:
   an identification information holding unit which outputs identification information which is preliminarily set as a fixed value in each device;
   a unique code generating unit which generates an initial unique code, the initial unique code being a value unique to the semiconductor device and including an error in a random bit;
   a first error correcting unit which is configured to receive external data from an external device and which corrects the error in the initial unique code based on the external data to generate an intermediate unique code, wherein the external data is data associated with the identification information;
   a second error correcting unit which corrects an error in the intermediate unique code to generate a first determinate unique code; and
   a decrypting unit which decrypts, with the first determinate unique code as first encryption key information, transmission data received from the external device, the transmission data being generated by the external device by encrypting confidential information with second encryption key information generated by the external device on the basis of the intermediate unique code, the decrypting reproducing the confidential information.

2. The semiconductor device according to claim 1,
   wherein the first error correcting unit receives bit mask data as the external data which designates a bit to be masked in bits of the initial unique code from the external device, and generates the intermediate unique code by using the bit mask data, and
   wherein the second error correcting unit generates the first determinate unique code by using an ECC code preliminarily held on an inside of the semiconductor device.

3. The semiconductor device according to claim 1,
   wherein the first error correcting unit receives an ECC code as the external data from the external device and generates the intermediate unique code by using the ECC code, and
   wherein the second error correcting unit generates the first determinate unique code by using bit mask data which designates a bit to be masked in bits of the initial unique code which is preliminarily held on an inside of the semiconductor device.

4. The semiconductor device according to claim 1, wherein the second encryption key information generated in the external device is a second determinate unique code generated by the same process as that of the second error correcting unit, performed in the external device.

5. The semiconductor device according to claim 1, further comprising:
   a correction data decrypting unit which receives encrypted data which is the data used for error correcting process in the first error correcting unit encrypted by using a common key cryptosystem, which performs a decrypting process on the encrypted data, and which outputs the decrypted data to the first error correcting unit.

6. The semiconductor device according to claim 1, wherein the initial unique code is PUF (Physically Unclonable Function) data including bits which become indeterminate due to manufacture variations in elements of the semiconductor device.

7. The semiconductor device according to claim 1, further comprising:
   an encrypting unit which performs encrypted communication using the confidential information as an encryption key.

8. The semiconductor device according to claim 1,
   wherein the unique code generating unit includes a static random access memory and generates the initial unique code using an initial value at a power on of the static random access memory.

9. A semiconductor device comprising:
   an identification information holding unit which outputs identification information which is preliminarily set as a fixed value in each device;
   a unique code generating unit which generates an initial unique code, the initial unique code being a value unique to the semiconductor device and including an error in a random bit, wherein the unique code generating unit includes a static random access memory and generates the initial unique code using an initial value at a power on of the static random access memory, and wherein the initial unique code is PUF (Physically Unclonable Function) data including bits which become indeterminate due to manufacture variations in elements of the static random access memory;
   a first error correcting unit which is configured to receive external data from an external device and which corrects the error in the initial unique code based on the external data to generate an intermediate unique code, wherein the external data is data associated with the identification information;
   a second error correcting unit which corrects an error in the intermediate unique code to generate a first determinate unique code; and
   a decrypting unit which decrypts, with the first determinate unique code as first encryption key information, transmission data received from the external device, the transmission data being generated by the external device by encrypting confidential information with second encryption key information generated by the external device on the basis of the intermediate unique code, the decrypting reproducing the confidential information.

10. The semiconductor device according to claim 9,
wherein the first error correcting unit receives bit mask data as the external data which designates a bit to be masked in bits of the initial unique code from the external device, and generates the intermediate unique code by using the bit mask data, and
wherein the second error correcting unit generates the first determinate unique code by using an ECC code
preliminarily held on an inside of the semiconductor device.

11. The semiconductor device according to claim 9,
wherein the first error correcting unit receives an ECC code as the external data from the external device and generates the intermediate unique code by using the ECC code, and
wherein the second error correcting unit generates the first determinate unique code by using bit mask data which designates a bit to be masked in bits of the initial unique code which is preliminarily held on an inside of the semiconductor device.

12. The semiconductor device according to claim 9,
wherein the second encryption key information
generated in the external device is a second determinate unique code generated by the same process as that of the second error correcting unit, performed in the external device.

13. The semiconductor device according to claim 9, further comprising:
a correction data decrypting unit which receives encrypted data which is the data used for error correcting process in the first error correcting unit encrypted by using a common key cryptosystem, which performs a decrypting process on the encrypted data, and which outputs the decrypted data to the first error correcting unit.

* * * * *